US012654175B2

(12) United States Patent
Shiau et al.

(10) Patent No.: US 12,654,175 B2
(45) Date of Patent: Jun. 16, 2026

(54) MANIPULATION UNIT AND MANIPULATION EQUIPMENT FOR BIOLOGICAL PARTICLE

(71) Applicant: NEAT BIOTECH, Inc., Hsinchu City (TW)

(72) Inventors: Jeng-Huei Shiau, Hsinchu City (TW); Chun-Lung Lien, Hsinchu City (TW)

(73) Assignee: NEAT BIOTECH, INC., Hsinchu City (TW)

(*) Notice: Subject to any disclaimer, the term of this patent is extended or adjusted under 35 U.S.C. 154(b) by 258 days.

(21) Appl. No.: 18/522,887

(22) Filed: Nov. 29, 2023

(65) Prior Publication Data

US 2024/0238803 A1 Jul. 18, 2024

(30) Foreign Application Priority Data

Jan. 12, 2023 (TW) ................................ 112101423

(51) Int. Cl.
*B03C 5/02* (2006.01)

(52) U.S. Cl.
CPC .................................. *B03C 5/024* (2013.01)

(58) Field of Classification Search
CPC ......... B03C 5/024; B03C 5/026; B03C 5/005; B03C 2201/26; C12M 35/02
See application file for complete search history.

(56) References Cited

U.S. PATENT DOCUMENTS 6,149,789 A * 11/2000 Benecke ................ B03C 5/005 204/547
2003/0047456 A1* 3/2003 Medoro ................. B03C 5/026 204/547

(Continued)

FOREIGN PATENT DOCUMENTS

CN 110257218 A 9/2019
TW 202241589 A 11/2022

(Continued)

OTHER PUBLICATIONS

Guo et al., Controllably moving individual living cell in an array by modulating signal phase difference based on dielectrophoresis, Biosensors and Bioelectronics, 2015, 68, 529-535 (Year: 2015).*

(Continued)

*Primary Examiner* — Shizhi Qian
(74) *Attorney, Agent, or Firm* — Birch, Stewart, Kolasch & Birch, LLP

(57) ABSTRACT

A manipulation unit adapted for manipulating a biological particle is provided. The manipulation unit comprises a substrate, a core electrode, an internal electrode, an external electrode and an insulating layer. The core electrode, the internal electrode, the external electrode and the insulating layer are configured on the substrate. The core electrode includes a core working electrode. The internal electrode includes a plurality of first working electrodes and a first connecting electrode electrically connected to the first working electrodes. The external electrode includes a plurality of second working electrodes and a second connecting electrode electrically connected to the second working electrodes. The first connecting electrode and the second connecting electrode are covered by the insulating layer. The core working electrode, the first working electrodes and the second working electrodes are respectively protruded from the insulating layer. The core working electrode is surrounded by the first working electrodes and the first working electrodes are surrounded by the second working electrodes.

8 Claims, 22 Drawing Sheets

(56) References Cited

U.S. PATENT DOCUMENTS

| | | | | |
|---|---|---|---|---|
| 2007/0221501 | A1 * | 9/2007 | Schnelle | B03C 5/026 204/600 |
| 2008/0108121 | A1 * | 5/2008 | Liu | C12N 5/0697 435/173.9 |
| 2008/0246489 | A1 * | 10/2008 | Coster | B01L 3/502761 324/446 |
| 2009/0008254 | A1 * | 1/2009 | Muller | B03C 5/026 204/547 |
| 2018/0016541 | A1 | 1/2018 | Hollah et al. | |
| 2020/0230605 | A1 | 7/2020 | Chiu et al. | |
| 2021/0349050 | A1 * | 11/2021 | Lien | G01N 27/3276 |
| 2022/0252543 | A1 * | 8/2022 | Huang | G01N 27/44782 |
| 2022/0348863 | A1 | 11/2022 | Lin et al. | |

FOREIGN PATENT DOCUMENTS

| | | | | |
|---|---|---|---|---|
| WO | WO-2009034514 | A2 * | 3/2009 | B03C 5/005 |
| WO | WO 2022/065112 | A1 | 3/2022 | |

OTHER PUBLICATIONS

Huang K., Automatic cell manipulation and patterning system using dielectrophoresis, PhD thesis of the Hong Kong Polytechnic University, Apr. 2020 (Year: 2020).*

Manaresi et al., A CMOS chip for individual cell manipulation and detection, IEEE Journal of Solid-State Circuits, 2003, 38, 2297-2305 (Year: 2003).*

Lin et al., Dielectrophoresis based-cell patterning for tissue engineering, Biotechnol. J., 2006, 1, 949-957 (Year: 2006).*

Cen et al., A combined dielectrophoresis, traveling wave dielectrophoresis and electrorotation microchip for the manipulation and characterization of human malignant cells, Journal of microbiological methods, 2004, 58, 387-401 (Year: 2004).*

Lliescu et al., A dielectrophoretic chip with a 3-D electric field gradient, Journal of microelectromechanical systems, 2006, 15, 1506-1513 (Year: 2006).*

* cited by examiner

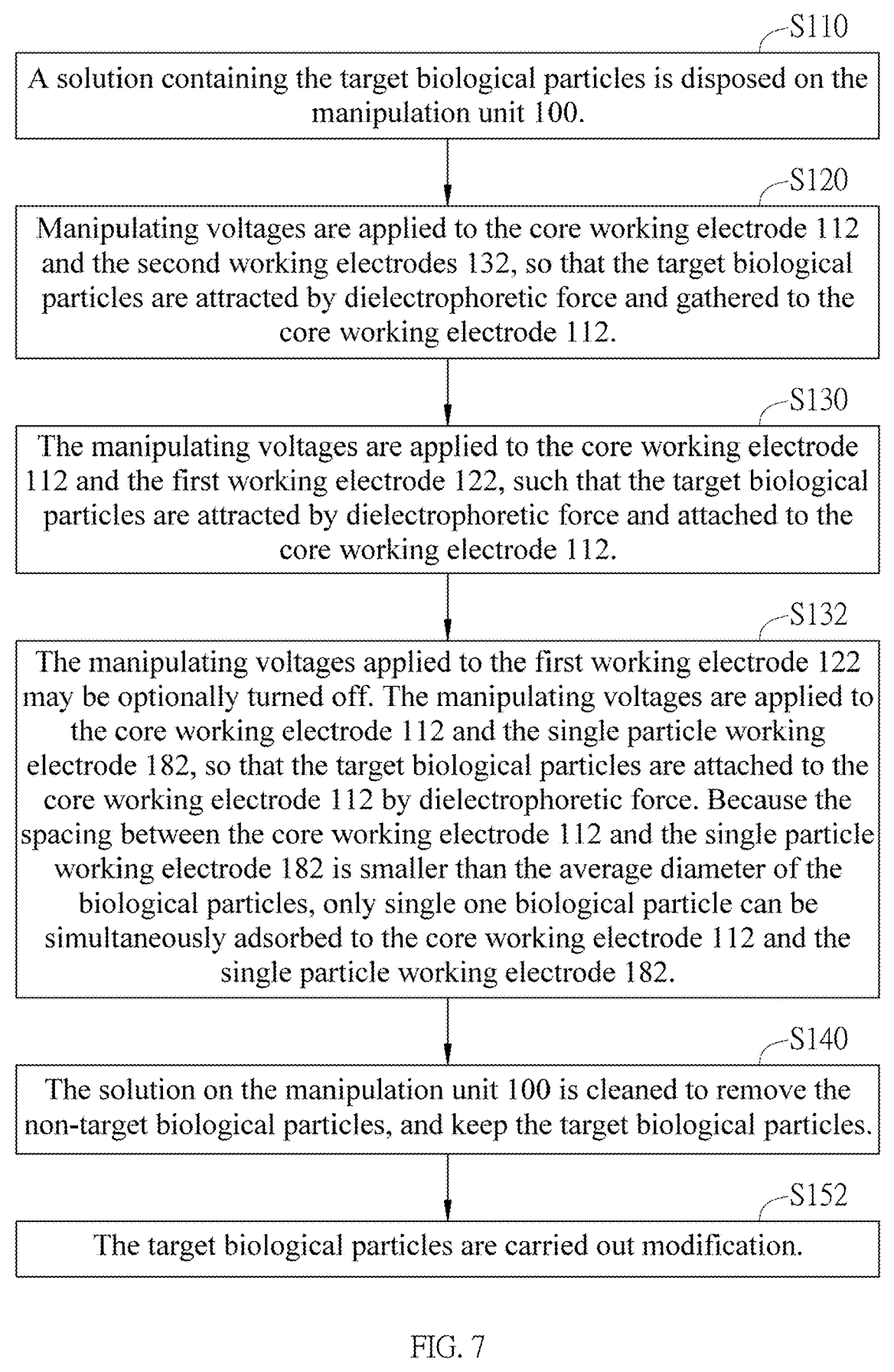

S110: A solution containing the target biological particles is disposed on the manipulation unit 100.

↓

S120: Manipulating voltages are applied to the core working electrode 112 and the second working electrodes 132, so that the target biological particles are attracted by dielectrophoretic force and gathered to the core working electrode 112.

↓

S130: The manipulating voltages are applied to the core working electrode 112 and the first working electrode 122, such that the target biological particles are attracted by dielectrophoretic force and attached to the core working electrode 112.

↓

S132: The manipulating voltages applied to the first working electrode 122 may be optionally turned off. The manipulating voltages are applied to the core working electrode 112 and the single particle working electrode 182, so that the target biological particles are attached to the core working electrode 112 by dielectrophoretic force. Because the spacing between the core working electrode 112 and the single particle working electrode 182 is smaller than the average diameter of the biological particles, only single one biological particle can be simultaneously adsorbed to the core working electrode 112 and the single particle working electrode 182.

↓

S140: The solution on the manipulation unit 100 is cleaned to remove the non-target biological particles, and keep the target biological particles.

↓

S152: The target biological particles are carried out modification.

FIG. 7

MANIPULATION UNIT AND MANIPULATION EQUIPMENT FOR BIOLOGICAL PARTICLE

BACKGROUND

Technical Field

The present invention relates to a manipulation unit and a manipulation equipment, and particularly relates to a manipulation unit and a manipulation equipment adapted for a biological particle.

Related Art

In recent years, since the development of biological technologies, manipulation technologies for various of biological particles have been generated. The manipulated biological particles may be a cell, a virus, a protein, or a deoxyribonucleic acid (DNA), etc. Since biological particle manipulation technologies can position respective biological particles, various physical, chemical, and biological characteristics can be measured and detected. Specific target biological particles may even be manipulated to achieve the objective of separating and purifying the specific target biological particles. When it is applied to a quarantine procedure, because of the rapid and precise biological particle manipulation, the number of specific biological particles, such as the number of specific viruses, can be determined earlier and the precision of the tests can be increased.

Herbert Pohl's detailed theoretical explanation in his book «dielectrophoresis» (1978) opened the door to the research on the manipulation of biological particles by dielectrophoresis (DEP). To this day, this technology can be widely applied to biological particles in various sizes and provide an excellent manipulating effect. In the dielectrophoresis (DEP) manipulation technology, a non-uniform electric field is formed by, for example, applying an alternating current (AC) to two non-parallel electrodes to generate a dielectrophoretic force for moving the target biological particle rapidly to a predetermined electrode position.

In addition, a cell electrofusion technology is invented by the scientist Zimmerman. He conducted systematic research on cell electrofusion technology in the 1980s and 1990s, and created a new situation in cell electrofusion technology, making cell fusion technology become the basic core technology of bioengineering. But the following insufficiencies still exist: (1) low cell-specific pairing rate results in generally about only 10% of cell fusion rate; (2) Since electrodes are disposed in conductive fusion solution, in order to establish a strong enough electric field strength between the electrodes, the output must be at least hundreds of volts or even thousands of volts, which requires a very high output power of the power supply. This results in high prices of cell electrofusion equipment, and there are hidden dangers in electrical safety, which hinders the widespread application of this technology; (3) The inducer of the chemical method is polyethylene glycol (PEG), and the cost of cell fusion using the PEG method is very low, making it the most widely used method. On the other hand, cell fusion technology also has many shortcomings that are difficult to overcome: (1) poor specific pairing and low fusion efficiency; the specific fusion rate of different cells is generally not high; (2) the cell fusion process is not easily controllable and reproducible; (3) Due to poor specific pairing, the amount of the inducer PEG required is also large. Since the inducer has a certain chemical toxicity to the cells, the greater the dosage, the stronger the toxic effect, which is harmful to the survival and functioning of fusion cells.

However, current designs using dielectrophoresis (DEP) operations are still imperfect. In order to achieve sufficient dielectrophoretic force, a sufficient operating voltage is applied on the electrodes to generate the required electric field. But this also generates a high joule heat (Q), which often causes death or destruction to cells or other biological particles that are sensitive to the operating environment. Hence, designing an appropriate operating structure such that the user can perform biological particle manipulation under a sufficient electric field which produces extremely low joule heat and trying not to cause death or destruction to biological particles, as well as designing a proper structure to improve cell fusion effect to avoid the aforementioned shortcomings of cell electrofusion technologies are the key problems to be solved for a person skilled in the art.

SUMMARY

One objective of the present invention is to provide a manipulation unit and a manipulation equipment adapted for a biological particle. Compared with traditional micro-electrodes, the manipulation unit and the manipulation equipment of the present invention having nano-electrodes with characteristics that can generate a stronger electric field and a smaller current under the same voltage conditions, so as to obtain stronger dielectrophoretic force for manipulation, and at the same time only generate extremely low joule heat. This is mainly from two principles: (1) electric field=voltage/electrode radius ($E=V/R_E$); (2) the current is proportional to the electrode area ($I \propto A_E$). Therefore, nano-electrodes can use a relatively small voltage to provide a non-uniform electric field with sufficient strength and prevent excessive high voltage and current (electric power) that generates a high temperature at a local region, which causes damage or death of the manipulated biological particles. The manipulation unit and the manipulation equipment of the present invention can use a Complementary Metal-Oxide-Semiconductor (CMOS) logic compatible material. On one hand, with the help of a CMOS logic manufacturing process, the nano-array electrode matrixes and combinational designs having high-throughput can be easily completed. On the other hand, CMOS logic control circuits can be further applied in a programmable control method for manipulating individual circuit electrode of multiple nanoelectrode matrix combinations and ultimately achieve the perfect situation of high throughput and precise control of the biological particles while not destroying the biological particles.

One embodiment of the present invention provides a manipulation unit adapted for manipulating a biological particle. The manipulation unit comprises a substrate, a core electrode, an internal electrode, an external electrode and an insulating layer. The core electrode, the internal electrode, the external electrode and the insulating layer are configured on the substrate. The core electrode includes a core working electrode. The internal electrode includes a plurality of first working electrodes and a first connecting electrode electrically connected to the first working electrodes. The external electrode includes a plurality of second working electrodes and a second connecting electrode electrically connected to the second working electrodes. The first connecting electrode and the second connecting electrode are covered by the insulating layer. The core working electrode, the first working electrodes and the second working electrodes are respectively protruded from the insulating layer. The core working electrode is surrounded by the first working electrodes and the first working electrodes are surrounded by the second working electrodes.

Another embodiment of the present invention provides a dual manipulation unit adapted for manipulating a biological particle. The dual manipulation unit comprises a substrate, a pair of core electrodes, a pair of internal electrodes, a pair of external electrodes, a dual electrode and an insulating layer. The core electrodes, the internal electrodes, the external electrodes, the dual electrode and the insulating layer are configured on the substrate. Each of the internal electrodes includes a plurality of first working electrodes and a first connecting electrode electrically connected to the first working electrodes. Each of the external electrodes includes a plurality of second working electrodes and a second connecting electrode electrically connected to the second working electrodes. The dual electrode including a plurality of dual working electrodes and a dual connecting electrode electrically connected to the dual working electrodes. The first connecting electrode, the second connecting electrode and the dual connecting electrode are covered by the insulating layer. The core working electrodes, the first working electrodes, the second working electrodes and the dual working electrodes are respectively protruded from the insulating layer. Each of the core working electrodes is correspondingly surrounded by the first working electrodes of each of the internal electrodes. The first working electrodes of each of the internal electrodes are correspondingly surrounded by the second working electrodes of each of the external electrodes. The second working electrodes of the pair of the external electrodes are surrounded by the dual working electrodes of the dual electrode.

Another embodiment of the present invention provides a dual manipulation unit adapted for manipulating a biological particle. The dual manipulation unit comprises a substrate, a first manipulation unit, a second manipulation unit, a dual electrode and an insulating layer. The first manipulation unit, the second manipulation unit, the dual electrode and the insulating layer are configured on the substrate. Each of the first manipulation unit and the second manipulation unit includes a core electrode, an internal electrode and an external electrode. The core electrode includes a core working electrode. The internal electrode includes a plurality of first working electrodes and a first connecting electrode electrically connected to the first working electrodes. The external electrode including a plurality of second working electrodes and a second connecting electrode electrically connected to the second working electrodes. The dual electrode including a plurality of dual working electrodes and a dual connecting electrode electrically connected to the dual working electrodes. The first connecting electrode, the second connecting electrode and the dual connecting electrode are covered by the insulating layer. The core working electrodes, the first working electrodes, the second working electrodes and the dual working electrodes are respectively protruded from the insulating layer. Each of the core working electrodes is correspondingly surrounded by the first working electrodes of each of the internal electrodes. The first working electrodes of each of the internal electrodes are correspondingly surrounded by the second working electrodes of each of the external electrodes. The second working electrodes of the external electrodes are surrounded by the dual working electrodes of the dual electrode.

Another embodiment of the present invention provides a manipulation equipment adapted for manipulating a biological particle. The manipulation equipment comprises a substrate, a plurality of core electrodes, a plurality of internal electrodes, a plurality of external electrodes and an insulating layer. The core electrodes are configured on the substrate and arranged in array, and each of the core electrodes includes a core working electrode. The internal electrodes are configured on the substrate and arranged in array. Each of the internal electrodes includes a plurality of first working electrodes and a first connecting electrode electrically connected to the first working electrodes. The external electrodes are configured on the substrate and arranged in array. Each of the external electrodes includes a plurality of second working electrodes and a second connecting electrode electrically connected to the second working electrodes. The insulating layer is configured on the substrate. The first connecting electrodes and the second connecting electrodes are covered by the insulating layer. The core working electrodes, the first working electrodes and the second working electrodes are respectively protruded from the insulating layer. Each of the core working electrodes is correspondingly surrounded by the first working electrodes of each of the internal electrodes. The first working electrodes of each of the internal electrodes are correspondingly surrounded by the second working electrodes of each of the external electrodes.

Compared with conventional technologies, the manipulation unit and the manipulation equipment of the present invention use the insulating layer to cover the first connecting electrode and the second connecting electrode, preventing unnecessary joule heat from flowing out. The core working electrode, the first working electrode and the second working electrode are protruded from the insulating layer. The core working electrode is surrounded by the first working electrodes, and the first working electrodes are surrounded by the second working electrodes. The structural design of the present invention uses relatively low power. The relatively low voltage and current provide a sufficiently strong electric field, so that high temperature at a local region caused by the joule heat generated from overly high voltage and current (i.e., power) can be prevented. The heat convection and thermal turbulence generated by joule heat to the solution at peripheral region can be prevented, so that the unnecessary flow of the biological particles can be reduced. The biological particles can then be easily attracted and adsorbed on the core electrode. The biological particles are perfectly manipulated on the target electrode, and death or damage of the biological particles during the manipulation process can be prevented. Since the structural design of the present invention uses a relatively smaller power to achieve the required continuous manipulation electric field strength, death or damage of biological particles will not likely occur. The user can perfectly achieve various manipulation objectives of the biological particles by using the manipulation unit. Especially for biological particles like single cells, death is not likely to occur and good manipulation effect can be achieved.

BRIEF DESCRIPTION OF THE DRAWINGS

FIG. 7 is an operation flow chart according to another embodiment of the present invention.

DETAILED DESCRIPTION

Figure 1B:
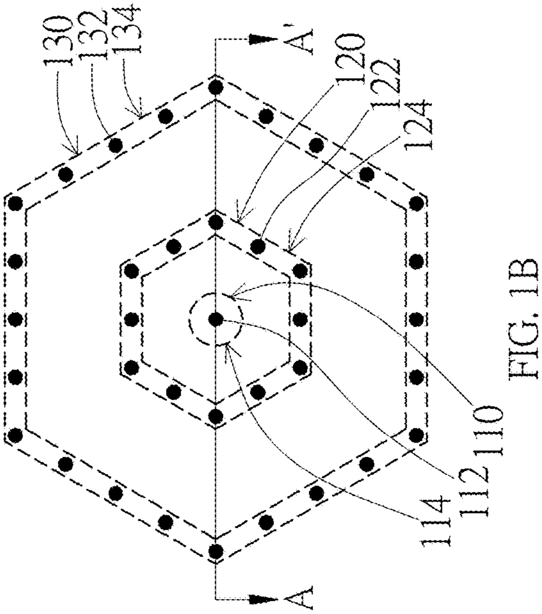
FIG. 1B is a schematic perspective view of a manipulation unit according to one embodiment of the present invention.

In various embodiments of the present invention, the terms used herein are only for the purpose of describing specific embodiments and are not limiting. As used herein, the singular forms "a", "an" and "the" are intended to include plural forms including "at least one" unless the context clearly indicates. As used herein, the term "a" includes any and all combinations of one or more related listed items.

In various embodiments of the present invention, "up", "down", "left", "right", "front" or "back" used herein are to describe the relationship between one element and another element, and are only to illustrate the orientation presented in the drawings, but not to limit its actual position. For apparatuses in the accompanying drawings, the orientation or direction of components of the apparatuses will not be limited by apparatus flipping.

Figure 1A:
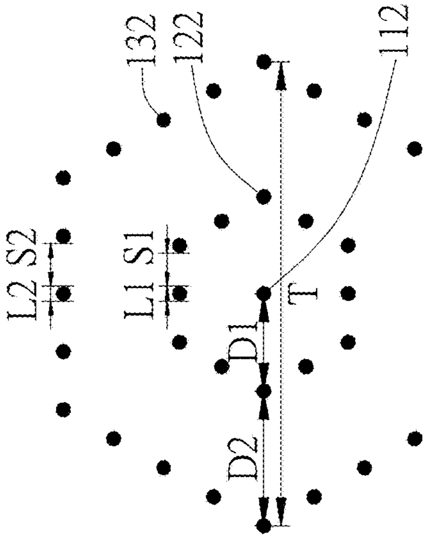
FIG. 1A is a schematic top view of a manipulation unit according to one embodiment of the present invention.
Figure 1C:
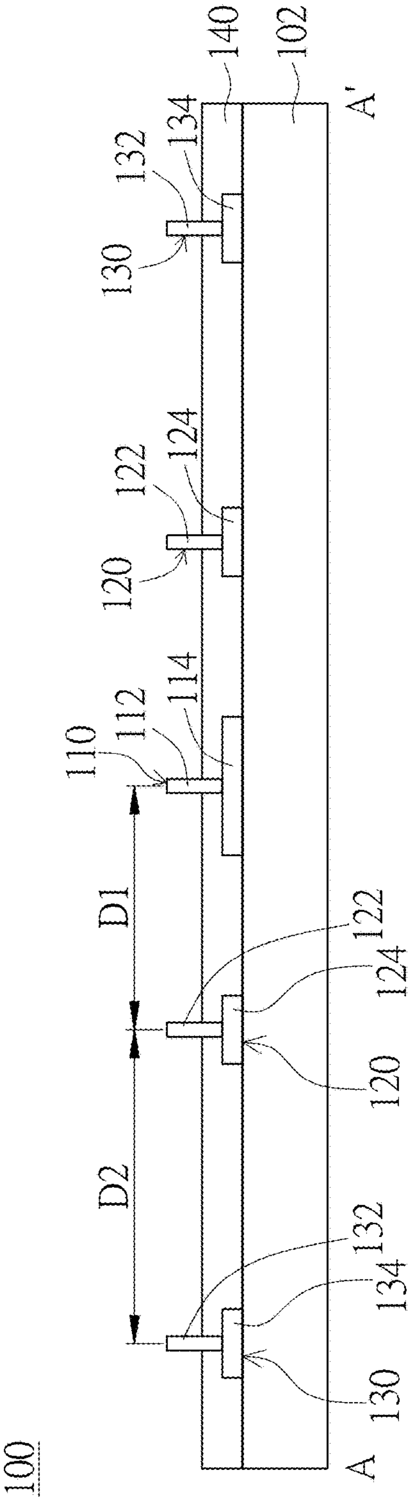
FIG. 1C is a schematic cross-sectional view along a cross-sectional line A-A' of FIG. 1B according to one embodiment of the present invention.

FIG. 1A is a schematic top view of a manipulation unit according to one embodiment of the present invention. FIG. 1B is a schematic perspective view of a manipulation unit according to one embodiment of the present invention. FIG. 1C is a schematic cross-sectional view along a cross-sectional line A-A' of FIG. 1B according to one embodiment of the present invention. Referring to FIGS. 1A, 1B and 1C, a manipulation unit 100 of the present invention is adapted for manipulating a biological particle. The biological particle for example may be a nano-grade biological particle, a micro-nano-grade biological particle, a micro-grade biological particle, and is not limited to an artificial biological particle or a natural biological particle. The biological particle is also not limited to a healthy biological particle, an infected biological particle or a modified biological particle and also not limited to a survived biological particle or a dead biological particle, and a proper biological particle may be selected depending on the requirements. The biological particle for example may be a whole or a part structure of micro-organisms, a whole or a part structure of various biological cells, a whole or a part structure of human cells or a whole or a part structure of other cells, but not limited thereto. Wherein, a part structure for example may be deoxyribonucleic acid (DNA), ribonucleic acid (RNA), protein, antibody, monoclonal antibody (mAb), polyclonal antibody (pAb), enzyme, mitochondrion, etc., and the above are just examples, and not limited thereto. The various microorganisms for example may be viruses, mycoplasma, chlamydia, rickettsia, bacteria, fungus, mold, phycomycete, actinobacteria, protozoa, prokaryotes, eukaryotes, etc., and the above are just examples, and not limited thereto. The biological cells for example may be prokaryotic cells, eukaryotic cells, plant cells, animal cells, etc., and are not limited to single cell organisms or multicellular organisms, and the above are just examples, and not limited thereto. The human cells for example may be erythrocytes, leukocytes, etc., and the above are just examples, and not limited thereto. Other cells for example may be tumor cells, hybridoma cells, etc., and the above are just examples, and not limited thereto.

Referring to FIGS. 1A, 1B and 1C, the manipulation unit 100 of the present invention at least comprises a substrate 102, a core electrode 110, an internal electrode 120, an external electrode 130 and an insulating layer 140. The core electrode 110, the internal electrode 120, the external electrode 130 and the insulating layer 140 are all configured on the substrate 102. The substrate 102 for example may be a semiconductor substrate, a ceramic substrate, a glass substrate, a plastic substrate, or a combination thereof. The material of the semiconductor substrate for example may be silicon (Si), germanium (Ge), gallium arsenide (GaAs), gallium phosphide (GaP), indium phosphide (InP), silicon carbide (SiC), gallium nitride (GaN) or aluminum gallium nitride (AlGaN), etc., but not limited thereto. The material of the ceramic substrate for example may be silicon oxide (SiOx), silicon nitride (SiNy), aluminum oxide (AlOx) or aluminum nitride (AlNy), etc., or a combination thereof, but not limited thereto. The material of the glass substrate for example may be soda lime glass, borosilicate glass, lead glass, quartz glass, tempered glass, etc., or a combination thereof, but not limited thereto. The material of the plastic substrate for example may be polyamide (PA), polyimide (PI), polycarbonate (PC), polyurethane (PU), polyethylenimine (PEI), polyethylene naphthalate (PEN), polyethylene terephthalate (PET), polyethersulfone (PES), fiber plastics (FRP), poly(methyl methacrylate (PMMA), polyetheretherketon (PEEK), polydimethylsiloxane (PDMS), etc., or other acrylate series polymer, ether series polymer, polyolefin series polymer, epoxy resin series polymer, or other suitable material, or a combination thereof, but not limited thereto.

Referring to FIGS. 1A, 1B and 1C, the core electrode 110 of the manipulation unit 100 is configured on the substrate 102. The core electrode 110 includes at least one core working electrode 112, i.e., it includes one or more core working electrodes 112. A core connecting electrode 114 is optionally configured below the core working electrode 112 and electrically connected to the core working electrode 112. If a plurality of core working electrodes 112 are used for the core electrode 110, those core working electrodes 112 may be electrically connected by the core connecting electrode 114. The core working electrode 112 may be a dot electrode. The shape of the dot electrode for example may be hemispherical, semi-ellipsoid, conical, cylindrical, hemispherical plus cylindrical, conical plus cylindrical, pyramidal, prismatic, pyramidal plus prismatic, star conical, star columnar, star conical plus star columnar, mushroom-shaped, etc., or of other suitable shape, but not limited thereto. The pyramid for example may be a triangular pyramid, quadrangular pyramid, pentagonal pyramid, hexagonal cone, octagonal cone, etc. The prism for example may be a triangular prism, square column, pentagon, hexagonal column, octagonal column, etc. The star cone for example may be a three-pointed star cone, four-pointed star cone, pentagram cone, hexagonal star cone, octagonal star cone, etc. The star column for example may be a triangular star pillar, four-pointed star column, pentagram, hexagonal column, octagonal star pillar, etc. The above are just examples. The shape of the dot electrode may be properly selected according to product requirements, and is not limited to any shape. In the embodiment, the core working electrode 112 may be a nano-grade cylindrical electrode as an example, but the size and the shape of the core working electrode 112 is not limited thereto. In a modified embodiment, if a plurality of core working electrodes 112 are used, the core connecting electrode 114, for example, may be a disc electrode, a ring electrode or electrodes of other shapes, such that all of the core working electrodes 112 are connected.

Referring to FIGS. 1A, 1B and 1C, the internal electrode 120 of the manipulation unit 100 is configured on the substrate 102, and one or more internal electrodes 120 can be configured thereon, but not limited thereto. The internal electrode 120 includes a plurality of first working electrodes 122 and a first connecting electrode 124 electrically connected to all of the first working electrodes 122. As shown in FIGS. 1A and 1B, the core working electrode 112 is surrounded by the first working electrodes 122, and there is no limit to the number of the first working electrodes 122 as long as a sufficient operating electric field can be achieved. In the embodiment, the distribution of the first working electrodes 122 is approximately hexagonal as an example. The distribution of the first working electrodes 122 can also resemble a circle, ellipse, triangle, quadrangle, pentagon, hexagon, octagon, three-pointed star, four-pointed star, pentagram star, hexagram star, octagonal star, etc., but not limited thereto. Each of the first working electrodes 122 may be a dot electrode. The detailed shape of the dot electrode may refer to the previously mentioned core working electrode 112, and will not be described in detail herein. In the embodiment, twelve first working electrodes 122 are used as an example. The dot electrode of the first working electrodes 122 may be a nano-grade cylindrical electrode for example, but the size and shape of the first working electrode 122 is not limited thereto. The first working electrode 122 may be of a shape different from the core working electrode 112. There is a first average distance D1 between the first working electrode 122 and the core working electrode 112. For example, using the geometric center of the core working electrode 112 as the origin, the distance from the center point of each of the first working electrodes 122 to the geometric center of the core working electrode 112 are measured, and the average value thereof is then calculated to obtain the first average distance D1, i.e., the internal electrode average radius R1 (not shown). The first average distance D1 may be designed by referring to the size and type of the biological particles, but not limited thereto. The first working electrodes 122 have a first average diameter L1 and a first average spacing S1 between the first working electrodes 122. The ratio L1/S1 of the first average diameter L1 to the first average spacing S1 may be substantially between, for example, 0.01 and 10, and can be properly designed and adjusted according to the distribution of the manipulating electric field, thereby achieving an ideal electric field distribution.

Referring to FIGS. 1B and 1C, a first connecting electrode 124 is configured below the first working electrode 122 and electrically connected to all of the first working electrodes 122. The shape of the first connecting electrode 124 may be designed according to the distribution of the first working electrode 122, but it may also be designed in another shape and not limited thereto. In the embodiment, the shape of the first connecting electrode 124 is a hexagonal ring as an example. The shape of the first connecting electrode 124 may also be, for example, a circular ring, an oval ring, a triangular ring, a square ring, a pentagonal ring, an octagonal ring, a three-pointed star ring, a four-pointed star ring, a pentagram ring, a hexagonal star ring, an octagonal star ring, etc., but not limited thereto. Since the first connecting electrode 124 is electrically connected to all of the first working electrodes 122, the AC current received by the first connecting electrode 124 can be rapidly transmitted to all of the first working electrodes 122, such that the first working electrodes 122 form the required manipulating electric field.

Referring to FIGS. 1A, 1B and 1C, an external electrode 130 of the manipulation unit 100 is configured on the substrate 102, and one or more external electrodes 130 may be configured thereon, and not limited thereto. The external electrode 130 includes a plurality of second working electrodes 132 and a second connecting electrode 134 electrically connected to all of the second working electrodes 132. As shown in FIGS. 1A and 1B, the first working electrodes 122 are surrounded by the second working electrodes 132. The number of the plurality of the second working electrodes 132 is not limited, as long as a sufficient manipulating electric field may be reached. In this embodiment, the distribution of the second working electrodes 132 is an approximately hexagonal distribution as an example. The distribution of the second working electrodes 132 can also be distributed approximately in the shape of a circle, ellipse, triangle, quadrangle, pentagon, hexagon, octagon, three-pointed star, four-pointed star, pentagram, hexagram, octagonal star, etc., but not limited thereto. Each of the second working electrodes 132 may be a dot electrode. Regarding the detailed shape of the dot electrode, one may refer to the previously mentioned core working electrode 112, and it will not be described in detail herein. In the embodiment, twenty-four second working electrodes 132 are used as an example. The dot electrode of the second working electrodes 132 may be a nano-grade cylindrical electrode as an example, but the size and shape of the second working electrode 132 is not limited thereto. The second working electrode 132 may be of a shape different from the core working electrode 112 or the first working electrode 122. There is a second average distance D2 between the second working electrode 132 and the first working electrode 122. For example, the geometric center of the core working electrode 112 can be used as the origin. The distance from the center point of each of the second working electrodes 132 to the geometric center of the core working electrode 112 is measured, and an average value is then calculated to obtain an external average radius R2 (not shown). The second average distance D2 can be obtained by subtracting the first average distance D1 (or the internal electrode average radius R1) from the external average radius R2. In other words, D2=R2−R1=R2−D1. The ratio D1/D2 of the first average distance D1 to the second average distance D2, for example, may be substantially between 0.1 and 10, and can be properly designed and adjusted according to the distribution of the manipulating electric field. In addition, each of the second working electrodes 132 has a second average diameter L2, and there is a second average space S2 formed between the second working electrodes 132. The second average diameter L2 and the second average space S2 may be designed depending on the sizes and types of the reference target biological particles, but not limited thereto. The ratio L2/S2 of the second average diameter L2 to the second average spacing S2, for example, may be substantially between 0.01 and 10, and can be properly designed and adjusted according to the distribution of the manipulating electric field.

In addition, an external electrode average diameter T can be thereby obtained, which is equal to twice the external average radius R2 (or the first average distance D1 plus the second average distance D2). In other words, T=2R2=2(D1+D2). The second average distance D2 of the second working electrode 132 and the external electrode average diameter T may be designed based on the sizes and types of the reference target biological particles, but not limited thereto. Furthermore, the manipulated target biological particle, for example, has an average diameter P between 0.001 micrometer (μm) and 1000 μm, and preferably, for example, between 0.01 μm and 100 μm, but not limited thereto. The ratio T/P of the external electrode average diameter T to the average diameter P of the biological particles, for example, may be substantially between 0.1 and 5, and can be properly designed and adjusted according to the distribution of the manipulating electric field, but not limited thereto. By utilizing the design, the probability of manipulating a single target biological particle to approach and adsorb on the core working electrode 112 can be therefore increased.

Referring to FIGS. 1B and 1C, a second connecting electrode 134 is configured below the second working electrodes 132 and electrically connected to all of the second working electrodes 132. The shape of the second connecting electrode 134 may be designed according to the distribution of the second working electrodes 132, but may also be designed in another shape, and not limited thereto. In the embodiment, the shape of the second connecting electrode 134 may be a hexagonal ring as an example. The shape of the second connecting electrode 134 may also be, for example, a circular ring, an oval ring, a triangle ring, a square ring, a pentagon ring, an octagon ring, a three-pointed star ring, a four-pointed star ring, a pentagram ring, a hexagram ring, an octagonal star ring, etc., but not limited thereto. The core connecting electrode 114, the first connecting electrode 124 and the second connecting electrode 134 may be for example configured in the form of a concentric ring, but not limited thereto. Since the second connecting electrode 134 is electrically connected to all of the second working electrodes 132, the AC current received by the second connecting electrode 134 can be rapidly transmitted to all of the second working electrodes 132, such that the second working electrodes 132 form the required manipulating electric field.

Referring to FIGS. 1A, 1B and 1C, an insulating layer 140 of the manipulation unit 100 is configured on the substrate 102. Wherein, the first connecting electrode 124 and the second connecting electrode 134 are covered by the insulating layer 140 to avoid unnecessary joule heat spillover. In addition, the insulating layer 140 can reduce the joule heat generated by the first connecting electrode 124 and the second connecting electrode 134 being transferred to nearby solution, causing liquid flow and damaging the dielectrophoretic force effect. If a core connecting electrode 114 is used for the core electrode 110 and the core connecting electrode 114 is larger than the core working electrode 112, the insulating layer 140 may also cover the core connecting electrode 114. As shown in FIGS. 1B and 1C, the core working electrodes 112, the first working electrodes 122 and the second working electrodes 132 protrude from the insulating layer 140. The core working electrode 112, the first working electrode 122 and the second working electrode 132, for example, may all be a dot electrode, such that the required manipulating electric field strength can be easily achieved, and the required voltage for manipulating can be relatively greatly reduced. Therefore, at the core working electrodes 112, the first working electrodes 122 and the second working electrodes 132, the target biological particles can be perfectly manipulated. At the same time, it can reduce unnecessary power generation that generates high temperature in local areas, which causes the manipulation of target biological particles in the adjacent area to be destroyed, or even death of the target biological particles. In addition, the electrode design of the present invention can achieve the objective of ideally manipulating target biological particles.

Referring to FIGS. 1A, 1B and 1C, the core working electrode 112 is surrounded by the first working electrodes 122 of the present invention, and the first working electrodes 122 are surrounded by the second working electrodes 132. The core working electrodes 112, the first working electrodes 122 and the second working electrodes 132 for example may be configured in an approximate concentric ring setting, but not limited thereto. By the electrode designs, the core working electrode 112, the first working electrodes 122 and the second working electrodes 132 are respectively applied with required manipulating voltages, so that the target biological particles can be easily adsorbed by the dielectrophoretic force to be gathered to the second working electrodes 132, the first working electrodes 122 and the core working electrode 112 and then attached to the core working electrode 112. In the embodiment, at most only one layer of the target biological particles for which the probability of such particles being adsorbed by the core working electrode 112 can be controlled. Through the design of the present invention in which the core working electrode 112 is surrounded by the first working electrodes 122 and the first working electrodes 122 are surrounded by the second working electrodes 132, the target biological particles can be easily attracted to move forward to the core working electrode 112 and adsorbed on the core working electrode 112 with high uniformity.

Figure 2A:
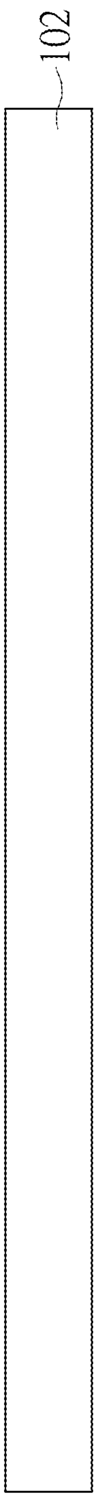
FIGS. 2A-2C are schematic diagrams of the manufacturing process corresponding to FIG. 1C according to one embodiment of the present invention.
Figure 2B:
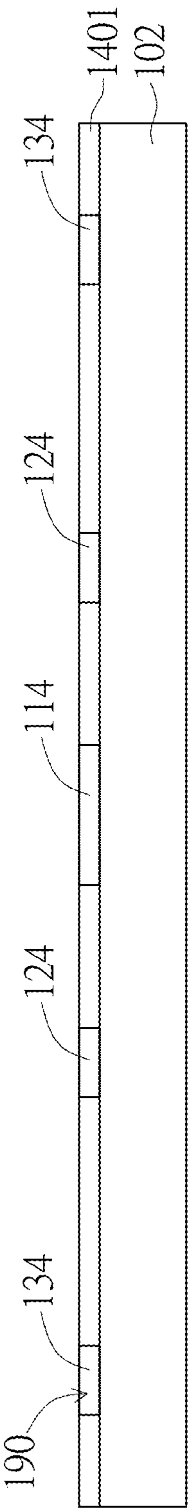
Figure 2C:
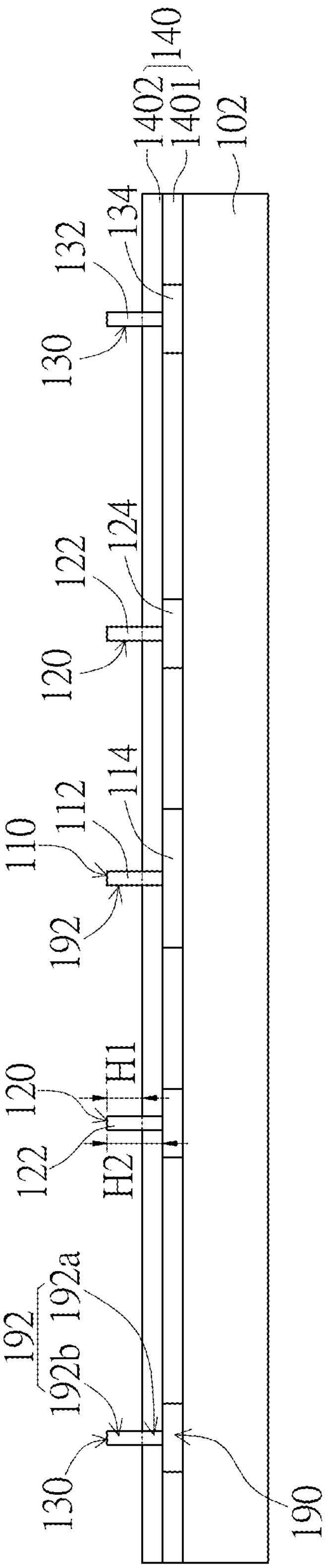

FIGS. 2A-2C are schematic diagrams of the manufacturing process corresponding to FIG. 1C according to one embodiment of the present invention. In the embodiment, only one manufacturing method is used as an example to illustrate the manufacturing method of the manipulation unit 100, but not limited thereto. Referring to FIG. 2A, a substrate 102 is first provided. Regarding to the detailed description of the substrate 102, one can refer to the relative descriptions of previous FIGS. 1A to 1C, and it will not describe in detail herein. In the embodiment, the substrate 102 is a semiconductor substrate as an example, and an insulating layer (not shown) is formed on the semiconductor substrate to facilitate subsequent process descriptions. Referring to FIG. 2B, a patterned insulating layer 1401 is then formed on the substrate 102. For example, an insulating layer is formed first by chemical vapor deposition (CVD). Then some required trenches are formed in the insulting layer by photolithography and etching processes to form the required patterned insulating layer. Alternatively, a negative type photoresist layer may be formed on the substrate 102 by a spin-on coating (SOC) process, and then the required trenches pattern may be formed in the photoresist layer by a photolithography process. The negative type photoresist layer is then cured to form the required patterned insulating layer 1401. The material of the insulating layer 140 may be, for example, silicon oxide, silicon nitride, silicon oxynitride, tetraethoxysilane, etc., or other low dielectric constant material, but not limited thereto.

Referring to FIG. 2B, a patterned conductive layer 190 including the core connecting electrode 114, the first connecting electrode 124 and the second connecting electrode 134 is formed in the patterned insulating layer 1401. In the patterned conductive layer 190, for example, a conductive layer covering the patterned insulating layer 1401 may first be formed to fill the trenches in the patterned insulating layer 1401. The conductive layer may be formed by, for example, an atomic layer deposition (ALD) process, a physical vapor deposition (PVD) process, a chemical vapor deposition (CVD) process, an electron beam vaporization process, a sputtering process, an electroplating process, etc., or other suitable processes. After that, a chemical mechanical polish (CMP) process is performed to planarize and remove excess portions of the conductive layer and leave only the portions of the conductive layer in the trenches, so that the required patterned conductive layer 190 is formed. The material of the patterned conductive layer 190 may be, for example, copper, aluminum, titanium, nickel, tungsten, silver, gold, aluminum copper (AlCu) alloy, aluminum silicon copper (AlSiCu) alloy, etc., or a combination thereof, or other suitable conductive materials, but not limited thereto.

Referring to FIG. 2C, a patterned insulating layer 1402 and a patterned conductive layer 192 are then formed, and the patterned conductive layer 192 includes the core working electrode 112, the first working electrodes 122 and the second working electrodes 132. The patterned insulating layer 1401 and the patterned insulating layer 1402 constitute the insulating layer 140. To form the patterned insulating layer, an insulating layer having a thickness substantially equal to the thickness of the patterned conductive layer 192 may be preformed, and then the required patterns may be formed in the insulating layer to form the patterned insulating layer. Regarding the manufacturing method of the patterned insulating layer, one may refer to the manufacturing method of the aforementioned patterned insulating layer 1401, and it will not be described in detail herein. After that, the patterned conductive layer 192 is formed in the patterned insulating layer. Regarding the manufacturing method of the patterned conductive layer 192, one may refer to the manufacturing method of the previously mentioned patterned conductive layer 190. Subsequently, an etching process having etching selectivity is performed to remove a partial thickness of the patterned insulating layer to expose portions of the patterned conductive layer 192, and thus forming the required patterned insulating layer 1402, the core working electrode 112, the first working electrodes 122 and the second working electrodes 132. In a modified embodiment, the patterned conductive layer 192 can be formed in two stages. A patterned insulating layer 1402 is formed, and then a lower part 192*a* of the patterned conductive layer 192 having a thickness substantially equal to that of the patterned insulating layer 1402 is formed in the patterned insulating layer 1402. Then, by using a deposition process, a photolithography process or an etching process, an exposed upper part 192*b* is formed on the lower part 192*a* of the patterned conductive layer 192. The lower part 192*a* and the upper part 192*b* constitute the patterned conductive layer 192. The lower part 192*a* and the upper part 192*b* may be of the same materials or different materials, or one may use the material of the patterned conductive layer 190. The upper part 192*b* or the surface of the upper part 192*b* may also be of a higher environmentally resistant material such as tungsten, titanium, tantalum, nickel, aluminum, gold, nickel chromium alloy, titanium nitride, nickel nitride, tantalum nitride, aluminum nitride, but not limited thereto. In another modified embodiment, the patterned conductive layer 190 and the patterned conductive layer 192 may be formed first, and then the insulating layer 140 is formed. This is well known by a person skilled in the art, and it will not be described in detail herein.

Referring to FIG. 2C, in the patterned conductive layer 192, the core working electrode 112, the first working electrodes 122 and the second working electrodes 132, for example, may have the same aspect ratios, or have different aspect ratios, and the ratio can be adjusted according to the product design requirements. Take the first working electrode 122 as an example. The first working electrode 122 has a first average diameter L1 (substantially equivalent to width), and the first working electrode 122 itself has a second average height H2 such as between 0.002 μm and 20 μm, but not limited thereto. The part of the first working electrode 122 protruding from the surface of the insulating layer 140 has a first average height H1 such as between 0.001 μm and 10 μm, but not limited thereto. Wherein, the aspect ratio H2/L1 of the first working electrode 122, for example, is approximately between 0.05 and 20. The aspect ratio H1/L1 of the exposed part of the first working electrode 122, for example, is approximately between 0.1 and 10. Regarding the aspect ratios of the core working electrode 112 and the second working electrodes 132, one may refer to the aspect design of the first working electrode 122, but not limited thereto. The sizes of the core working electrode 112, the first working electrodes 122 and the second working electrodes 132 may be adjusted according to the requirements, but not limited thereto. By utilizing the above design of the core working electrode 112, the first working electrodes 122 and the second working electrodes 132 protruding from the insulating layer 140, a required high-intensity electric field can be easily formed with only a relatively small voltage. The design of the present invention dramatically shrinks the electrode radius and electrode areas of the core working electrode 112, the first working electrodes 122 and the second working electrodes 132. Two principles are used: (1) electric field=voltage/electrode radius ($E=V/R_E$); and (2) Current is proportional to the electrode area ($I\propto A_E$). Compared with the conventional electrode design, the generated joule heat is, for example, less than one present (1/100). Hence, the generation of unnecessary power can be prevented, and an unnecessary joule heat transfer to the solution can also be prevented. The joule heat transfer can cause high temperature formed in local regions and introduce liquid flow or heat convection or thermal turbulent flow to the surrounding solution due to joule heat, resulting in unnecessary flow of the biological particles. Therefore, under this setting, the unnecessary joule heat transfer to the biological particles can be reduced and the manipulation of the biological particles can be greatly improved.

Figure 3:
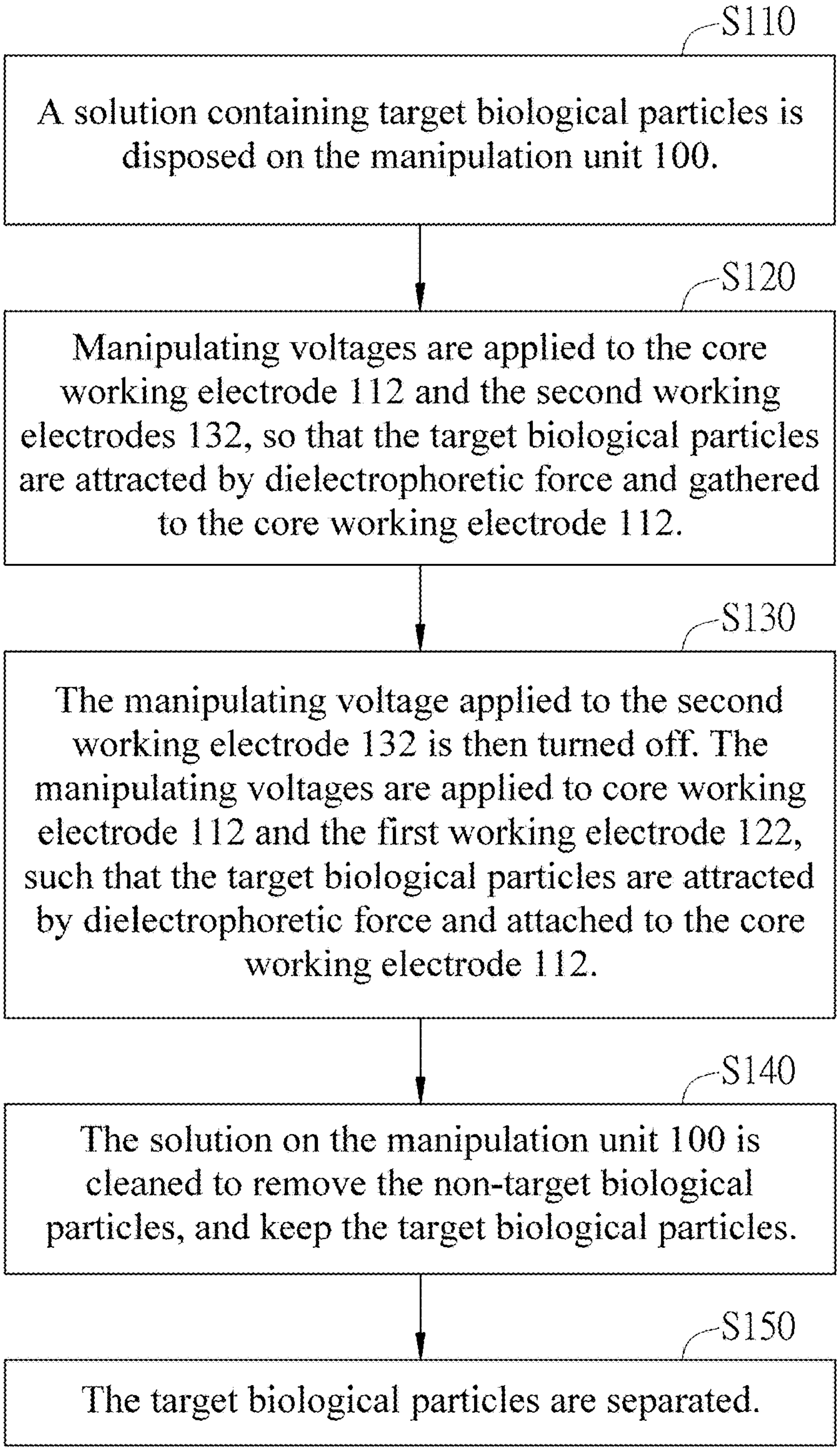
FIG. 3 is an operation flow chart according to one embodiment of the present invention.

FIG. 3 is an operation flow chart according to one embodiment of the present invention. Regarding the manipulation unit 100 of the present invention, one may refer to the designs of previous embodiments of FIGS. 1A to 2C. In one example, the biological particle is a cell with an average diameter P about 7 μm, and the external electrode average diameter T of the manipulation unit 100 can be designed to be about 5 μm. For example, the first working electrodes 122 may designed with 6 circular distributions. The first average distance D1 may be designed to be about 1.5 μm. The first average diameter L1 may be designed to be about 0.3 μm. The first average height H1 may be designed to be about 0.3 μm. The second working electrodes 132 may be designed with 12 circular distributions. The second average distance D2 may be designed to be about 1.0 μm. The second average diameter L2 may be designed to be about 0.3 μm. The first average height H1 may be designed to be about 0.3 μm. The above example is just for illustrative purpose, and not limited thereto.

Referring to FIG. 3, firstly, a solution containing target biological particles is disposed on the manipulation unit 100 (Step S110). In the embodiment, the target biological particles are red blood cells as an example. The solution can be a solution suitable for the survival of the red blood cells. The solution can be, for example, a suitable aqueous solution such as phosphate series buffered solutions, but not limited thereto. In another embodiment, the solution containing other types of target biological particles can be other types of solution such as an organic solution, a gel solution, a polymer solution, a mixed solution or gas solution (a cover can be used for assistance), but not limited thereto. For example, the solution containing the target biological particles is dropped on the manipulation unit 100 by using a dropper device, and a cover can be optionally used to facilitate the flow of the solution.

Next, manipulating voltages are applied to the core working electrode 112 and the second working electrodes 132 so that the target biological particles are attracted by dielectrophoretic force and gathered to the core working electrode 112 (Step S120). For example, a constant voltage or ground may be applied to the core working electrode 112. An alternative current (AC) voltage is applied to the second working electrode 132. The applied AC voltage is a dielectrophoretic voltage which has a frequency, for example, between 10 Hz and 100 MHz, and can be adjusted according to the dielectrophoretic manipulation. The applied AC voltage, for example, may be between +10V and −10V, or even between +1V and −1V. The absolute value of the applied AC voltage, for example, may be between 1V and 50V, but not limited thereto, and can be adjusted according to the dielectrophoretic manipulation. Depending on the applied AC voltage, it can be generally divided into positive dielectrophoresis (PDEP), which has an applied AC voltage, for example, between +10V and −10V, and negative dielectrophoresis (NDEP), which has an applied AC voltage, for example, between −10V and +10V. Using the red blood cells as an example, when the applied AC voltage, for example, may be between +10V and −10V, the red blood cells in the solution are easily attracted by the dielectrophoretic force of PDEP, such that the red blood cells are gathered towards the core working electrode 112.

In a conventional calculation module for dielectrophoretic force, which is usually used for manipulation and separation of biological particles, the dielectrophoretic force can be more preciously calculated. The calculation formula for dielectrophoretic force is as follows:

$$F_{DEP}=2\pi\varepsilon_m r^3\mathrm{Re}[f_{CM}(\omega)]\nabla|E|^2 \tag{1}$$

$F_{DEP}$ is a dielectrophoretic force on the biological particles. $\varepsilon_m$ is the dielectric constant of the solution. r is the radius of the biological particle. $f_{CM}(\omega)$ is the Clausius-Mossotti factor. ω is the electric field angular frequency. $\mathrm{Re}[f_{CM}(\omega)]$ is the real part of the Clausius-Mossotti factor. $\nabla|E|^2$ is the gradient of the square of the electric field. When $\mathrm{Re}[f_{CM}(\omega)]>0$, a PDEP is generated and the biological particles are moved towards the electrode; and when $\mathrm{Re}[f_{CM}(\omega)]<0$, a NDEP is generated and the biological particles are moved backwards from the electrode. By matching the dielectric constant of the solution and adjusting a proper AC voltage frequency, a PDEP is generated, and the biological particles can be manipulated to gather towards the core working electrodes 112.

Moreover, for biological particles of various sizes and types, one can use different E-critical to further regulate incoming biological particles. For example, the electric field for virus and protein is about $10^8$ V/m. The electric field for bacteria is about $10^6$ V/m. The electric field for fungus is about $10^5$ V/m. The electric fields for blood cells and cells are about $10^4$ V/m. The second working electrode 132 of the present invention can easily form an electric field strength of about $10^6$ V/m so that the red blood cells can be easily manipulated and not cause the death of the red blood cells. If it is necessary to manipulate viruses and proteins, the electric field strength can be easily adjusted to $10^8$ V/m, and the structures of the viruses and the proteins will not be easily damaged.

Next, turning off the manipulating voltage applied to the second working electrode 132 and applying manipulating voltages to the core working electrode 112 and the first working electrode 122, so that the target biological particles are attracted by dielectrophoretic force and become attached to the core working electrode 112 (Step S130). The manipulating voltages of the second working electrode 132 and the first working electrode 122 are adjusted by using time sequential voltage control. For example, the AC voltage applied to the second working electrode 132 may be between +10V and −10V, and the AC voltage applied to the first working electrode 122 may be between +5V and −5V, but not limited thereto. The red blood cells near the second working electrode 132 are attracted to the first working electrode 122 and substantially adsorbed to the core working electrode 112. An AC voltage may be applied to the core working electrode 112, if required, to further attract the red blood cells to be adsorbed to the core working electrode 112. Since the distance between the core working electrode 112 and the first working electrode 122 is quite small, only a single layer of biological particles can be adsorbed to the core working electrode 112, and the other non-target biological particles will not be adsorbed and remain suspended in the solution.

Next, the solution on the manipulation unit 100 is cleaned to remove non-target biological particles and keep the target biological particles (Step S140). For example, a clean solution not containing any particle is used to perform a cleaning operation to the manipulation unit 100 to remove non-target biological particles. Since the target biological particles are generally adsorbed to the core working electrode 112, the manipulating voltage is still applied during cleaning so that the target biological particles can be maintained in an adsorbed state and will not be washed out by the cleaning solution and fall off. Since the cleaning solution is also a cleaning solution suitable for the survival of biological particles, it is not easy to cause death or damage to the biological particles during the cleaning process.

Finally, the target biological particles are separated (Step S150). The manipulating voltages applied to the core working electrode 112 and the first working electrode 122 are stopped or a reverse voltage is applied to separate the target biological particles from the manipulation unit 100 so that the effect of separating and purifying target biological particles can be achieved. Using a plurality of manipulating units, the effect of separating and purifying a large number of target biological particles can then be achieved. Later, a plurality of the manipulating units in an array arrangement will be described regarding achieving high-throughput purification effects.

Figure 4B:
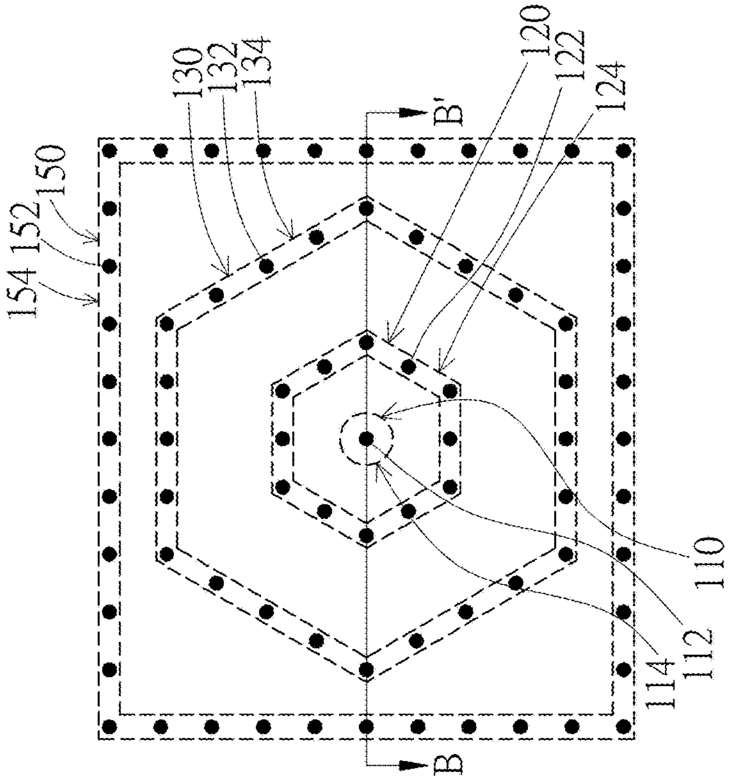
FIG. 4B is a schematic perspective view of a manipulation unit according to another embodiment of the present invention.
Figure 4A:
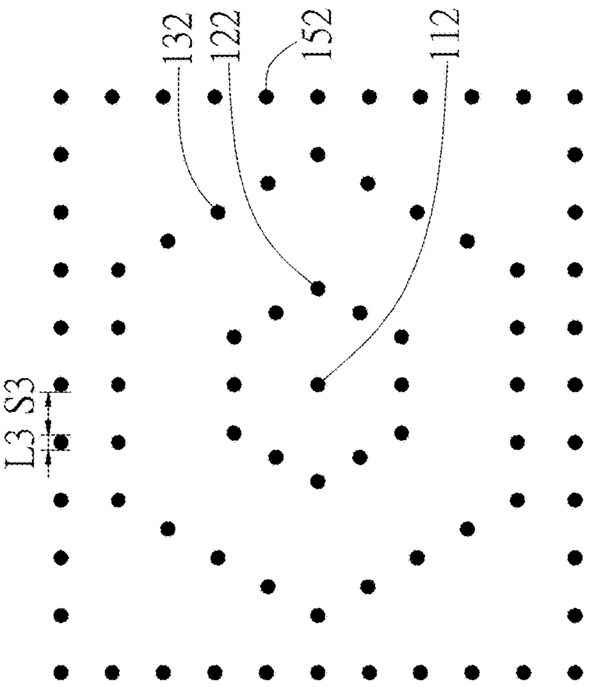
FIG. 4A is a schematic top view of a manipulation unit according to another embodiment of the present invention.
Figure 4C:
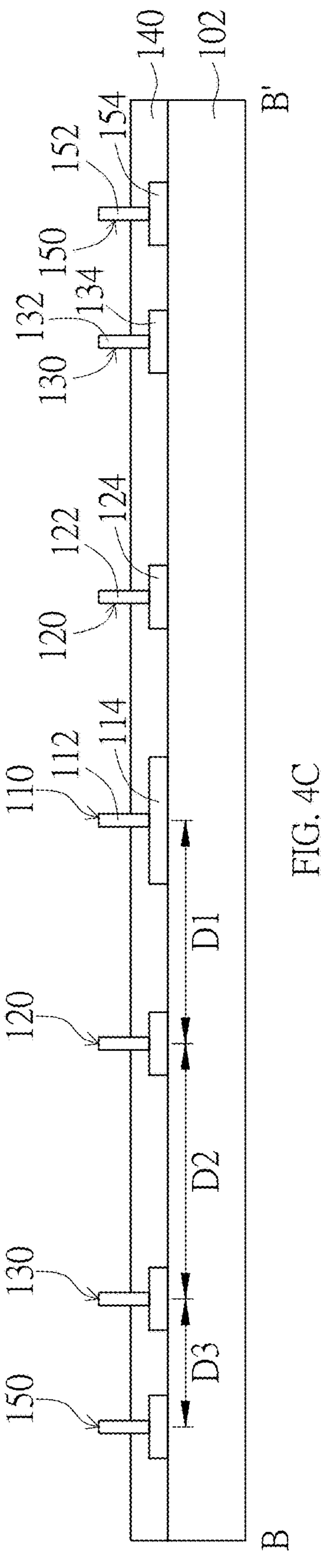
FIG. 4C is a schematic cross-sectional view along a cross-sectional line B-B' of FIG. 4B according to another embodiment of the present invention.

FIG. 4A is a schematic top view of a manipulation unit according to another embodiment of the present invention. FIG. 4B is a schematic perspective view of a manipulation unit according to another embodiment of the present invention. FIG. 4C is a schematic cross-sectional view along a cross-sectional line B-B' of FIG. 4B according to another embodiment of the present invention. In the embodiment, similar to the previous embodiments illustrated in FIGS. 1A to 1C, the same reference numbers can be correspondingly referred, but not limited thereto. Referring to FIGS. 4A, 4B and 4C, an auxiliary external electrode 150 can be optionally added outside the external electrode 130 to improve the attraction to the target biological particles. The outer side of the external electrode 130 for example may be surrounded by the auxiliary external electrode 150. The pattern design of the auxiliary external electrode 150 may be the same or different from the pattern design of the external electrode 130. In the embodiment, the auxiliary external electrode 150 may, for example, adopt a square design, which is different from the hexagonal design of the external electrode 130. This will help the plurality of the manipulation units 100 to be arranged into an array, but the design of the auxiliary external electrode 150 is not limited thereto.

Referring to FIGS. 4A, 4B and 4C, in the embodiment, the manipulation unit 100 of the present invention at least comprises a substrate 102, a core electrode 110, an internal electrode 120, an external electrode 130 and an insulting layer 140, and further optionally comprises an auxiliary external electrode 150. The core electrode 110, the internal electrode 120, the external electrode 130, the insulting electrode 140 and the auxiliary external electrode 150 are all configured on the substrate 102. Regarding the detail descriptions of the substrate 102, the core electrode 110, the internal electrode 120, the external electrode 130 and the insulting electrode 140, one may refer to the previous descriptions of the embodiments illustrated in FIGS. 1A to 1C, and it will not be described in detail herein.

Referring to FIGS. 4A, 4B and 4C, in the embodiment, the auxiliary external electrode 150 of the manipulation unit 100 is configured on the substrate 102, and one or more auxiliary external electrodes 150 may be configured. The auxiliary external electrode 150 comprises a plurality of third working electrodes 152 and a third connecting electrode 154 connected to all of the third working electrodes 152. As shown in FIGS. 4A and 4B, the second working electrodes 132 are surrounded by the third working electrodes 152. The number of the third working electrodes 152 is not limited as long as it achieves a sufficient operating electric field. The core working electrode 112, the first working electrodes 122, the second working electrodes 132 and the third working electrodes 152 may, for example, be configured in an approximate concentric ring distribution, but not limited thereto. In the embodiment, the distribution of the third working electrodes 152 is exemplified by only an approximate quadrangular distribution. The distribution of the third working electrodes 152 may also be an approximate circle, oval, triangle, pentagon, hexagon, octagon, three-pointed star, four-pointed star, five-pointed star, six-pointed star, eight-pointed star, etc., but not limited thereto. The shape of each of the third working electrodes 152 may be a dot electrode. Regarding the shape of the dot electrode, one may refer to the related previous descriptions of the core working electrode 112, the first working electrodes 122 or the second working electrodes 132, and it will not be described in detail herein. In the embodiment, forty third working electrodes 152 are used as an example. The dot electrodes of the third working electrodes 152 may be a nano-grade cylindrical electrode as an example, but the size and shape of the third working electrodes 152 is not limited thereto. The third working electrode 152 may also be of a shape different from the shapes of the core working electrode 112, the first working electrodes 122 and the second working electrodes 132. There is a third average distance between the third working electrode 152 and the second working electrode 132. For example, the geometric center of the core working electrode 112 can be used as the origin. The distances from the central point of each of the third working electrodes 152 to the geometric center of the core working electrode 112 are measured and the average value thereof is calculated. An auxiliary external electrode average radius R3 (not shown) can be therefore obtained. A third average distance D3 can be obtained by subtracting the second average distance D2 (or the external electrode average radius R2) from the auxiliary external electrode average radius R3. In other words, D3=R3−R2=R3−D2. The ratio D2/D3 of the second average distance D2 to the third average distance D3, for example, may be substantially between 0.1 and 10, and can be properly designed and adjusted according to the distribution of the manipulating electric field. Moreover, the third working electrode 152 has a third average diameter L3, and there is a third average spacing S3 between the third working electrodes 152. The third average diameter L3 and the third average spacing S3 may be designed depending on the size and type of the target biological particles, but not limited thereto. The ratio L3/S3 of the third average diameter L3 to the third average spacing S3, for example, may be substantially between 0.01 and 10, and can be designed and adjusted according to the distribution of the manipulating electric field. In addition, the portion of the third working electrode 152 protruding from the insulating layer 140 has a first average height H1, and the third working electrode 152 itself has a second average height H2. Regarding this part, one can refer to the related description of the previously mentioned first working electrode 122, and it will not be described in detail herein.

Referring to FIGS. 4B and 4C, a third connecting electrode 154 is configured below the third working electrodes 152 and electrically connected to all of the third working electrodes 152. The shape of the third connecting electrode 154 may be designed corresponding to the distribution of the third working electrodes 152, and can also be designed in another way, but not limited thereto. In the embodiment, the shape of the third connecting electrode 154 is a four-corner ring as an example. The shape of the third connecting electrode 154 may also be, for example, a circular ring, an oval ring, a triangular ring, a square ring, a pentagonal ring, an octagonal ring, a three-pointed star ring, a four-pointed star ring, a pentagram ring, a hexagram ring, an octagonal star ring, etc., but not limited thereto. Since the third connecting electrode 154 is electrically connected to all of the third working electrodes 152, the AC current received by the third connecting electrode 154 can be rapidly transmitted to all of the third working electrodes 152, such that the third working electrodes 152 form the required manipulating electric field. The design of the auxiliary external electrode 150 increases the attraction of the external side to the peripheral target biological particles. The target biological particles are attracted to approach the external side, which is advantageous to the subsequent continual attraction of the external electrodes 130 and the internal electrodes 120, by which the target biological particles are continued to be attracted to the core working electrode 112. Moreover, the design of the auxiliary external electrode 150 facilitates the arrangement of an array of a plurality of the manipulation units 100, but not limited thereto. By the design of the present invention, wherein the core working electrode 112 is surrounded by the first working electrodes 122, the first working electrodes 122 are surrounded by the second working electrodes 132, and the second working electrodes 132 are surrounded by the third working electrodes 152, the target biological particles can be easily attracted to move towards the core working electrode 112 and substantially adsorbed to the core working electrode 112.

Figure 5A:
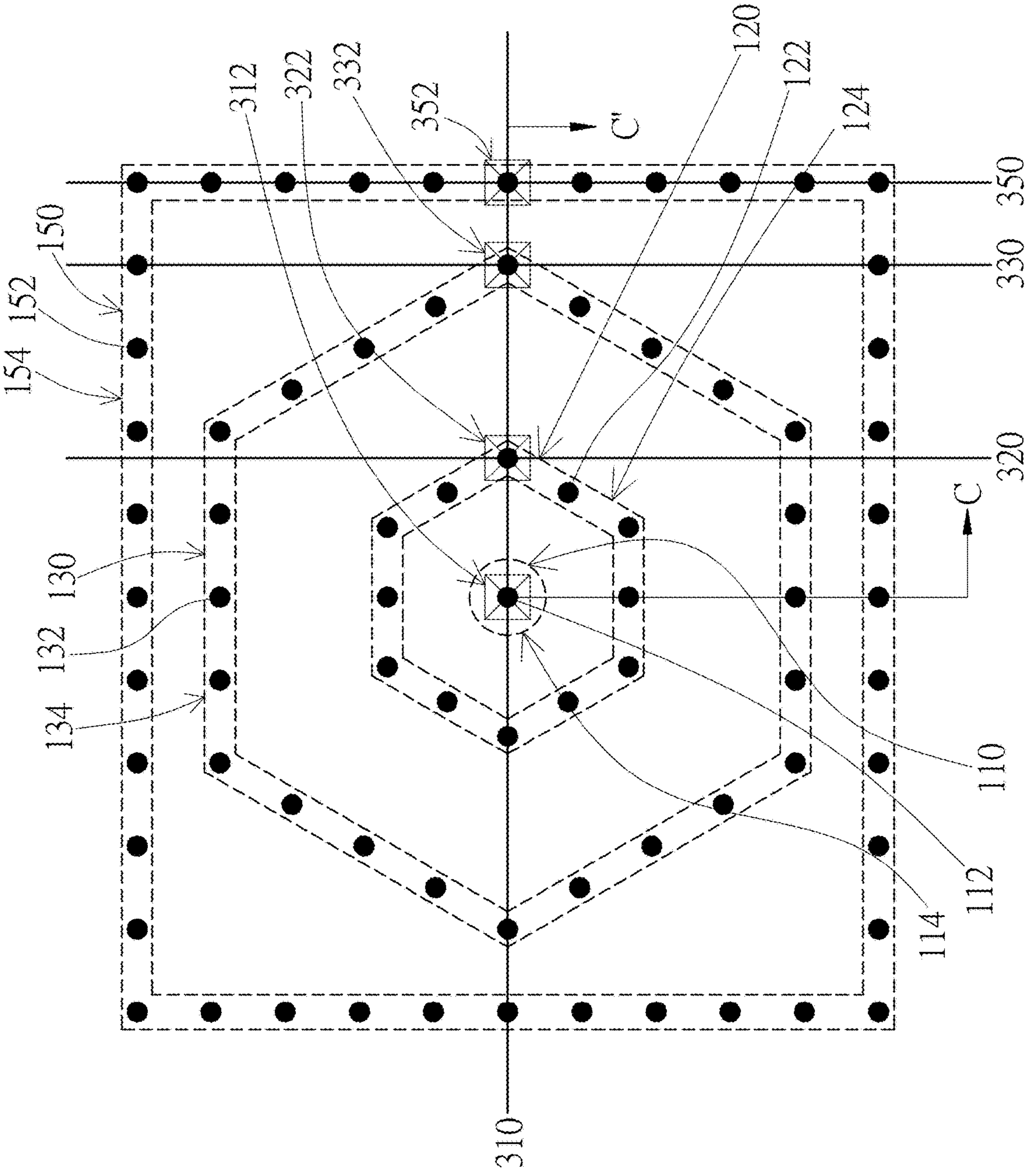
FIG. 5A is a schematic perspective view of a manipulation unit according to another embodiment of the present invention.
Figure 5B:
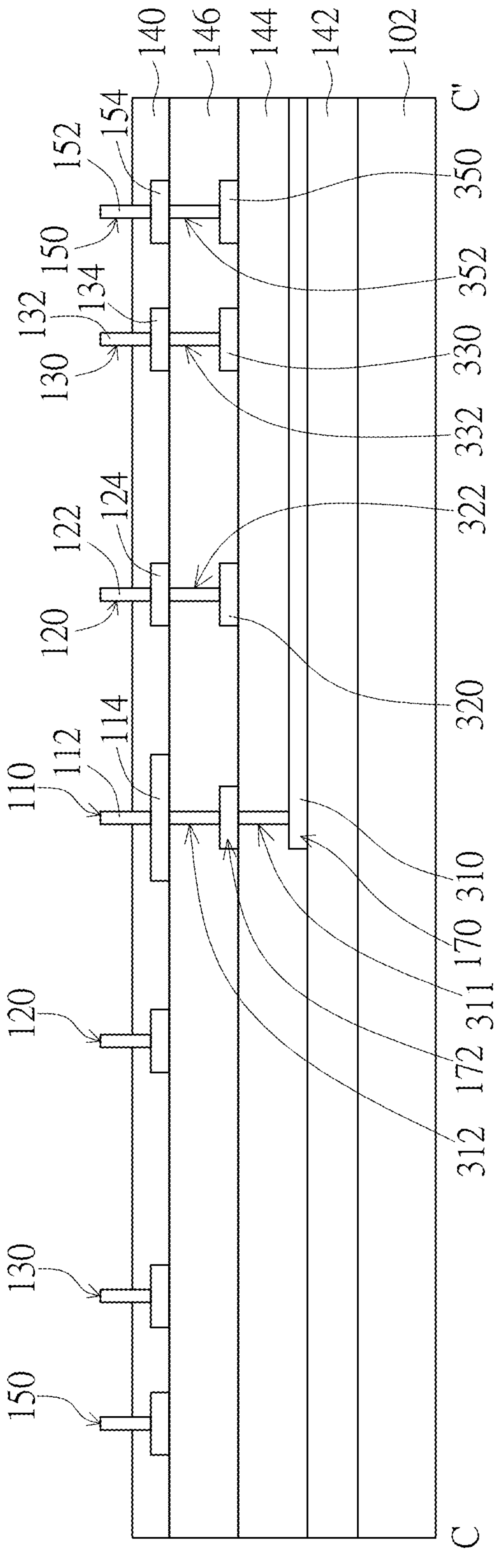
FIG. 5B is a schematic cross-sectional view along a cross-sectional line C-C' of FIG. 5A according to another embodiment of the present invention.

FIG. 5A is a schematic perspective view of a manipulation unit according to another embodiment of the present invention. FIG. 5B is a schematic cross-sectional view along a cross-sectional line C-C' of FIG. 5A according to another embodiment of the present invention. Referring to FIGS. 5A and 5B, in the embodiment, a via plug is used as an example to respectively connect the core connecting electrode 114, the first connecting electrode 124, the second connecting electrode 134, and the third connecting electrode 154 to the corresponding connecting lines for applying manipulating voltages. This design can be applied to form a large array of multiple manipulation units 100 and suitable for the requirement of high throughput manipulation.

Referring to FIG. 5A, the core connecting electrode 114 of the core electrode 110 can be electrically connected to a core connecting line 310 through the via plug. The core connecting line 310 may, for example, be designed along the row direction and electrically connected to a constant voltage or ground, but not limited thereto. The first connecting electrode 124 of the internal electrode 120 may be electrically connected to a first connecting line 320 through a via plug 322. The first connecting line 320 may, for example, be designed along the column direction and electrically connected to a first AC voltage. The second connecting electrode 134 of the external electrode 130 may be electrically connected to a second connecting line 330 through a via plug 332. The second connecting line 330 may, for example, be designed along the column direction and electrically connected to a second AC voltage. The third connecting electrode 154 of the auxiliary external electrode 150 may be electrically connected to a third connecting line 350 through a via plug 352. The third connecting line 350 may, for example, be designed along the column direction, and electrically connected to a third AC voltage. The third connecting line 350, the second connecting line 330 and the first connecting line 320 are applied with manipulating voltages using time sequence control. For example, the third connecting line 350 may be applied with an AC voltage between +15V and −15V. The second connecting line 330 may be applied with an AC voltage between +10V and −10V. The first connecting line 320 may be applied with an AC voltage between +5V and −5V, but not limited thereto. The target biological particles are gradually attracted to and approach the core electrode 110 by dielectrophoretic force to achieve the purpose of adsorbing the target biological particles to the core electrode 110.

Referring to FIG. 5B, in the embodiment, two patterned conductive layers 170, 172 are used as an example for manufacturing connecting lines and achieving the required electrical isolation, but not limited thereto. An insulating layer 142, such as an intermetal dielectric (IMD) layer, for example, is formed on the substrate 102, and adjusted according to the requirements. Next, the patterned conductive layer 170, a via plug 311 and an insulating layer 144 are formed on the insulating layer 142. For the detailed fabrication method, one may refer to descriptions of the previous embodiments illustrated in FIGS. 2A to 2C, and it will not be described in detail herein. The patterned conductive layer 170 includes the core connecting line 310. Then, the patterned conductive layer 172, via plugs 312, 322, 332, 352 and an insulating layer 146 are formed on the insulating layer 144. For the detailed fabrication method, one may refer to the descriptions of the previous embodiments, and it will not be described in detail herein. The patterned conductive layer 172 includes the first connecting line 320, the second connecting line 330, the third connecting line 350 and the contact pad between the via plug 311 and the via plug 312. Finally, regarding the fabrication of core electrode 110, the internal electrode 120, the external electrode 130 and the insulating layer 140, one may refer to the previous descriptions, and it will not be described in detail herein. In a modified embodiment, if the via plugs are not used, breaking gaps may be formed in the first connecting electrode 124, the second connecting electrode 134 and the third connecting electrode 154. The core connecting line 310, the first connecting line 320, the second connecting line 330, and the third connecting line 350 can be fabricated in one layer by using the gaps, and respectively electrically connect to the corresponding electrodes. This is well known by a person skilled in the art, and will not describe in detail herein.

Figure 5C:
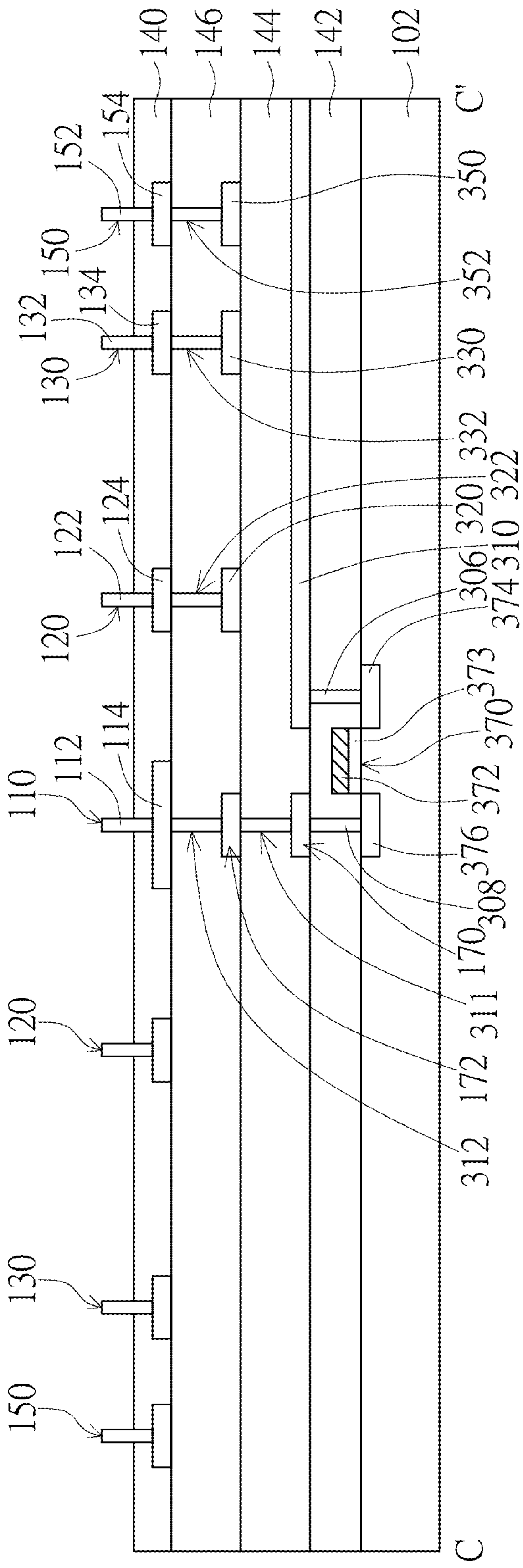
FIG. 5C is a schematic cross-sectional view corresponding to FIG. 5B in which a field effect transistor is connected to a core electrode according to another embodiment of the present invention.

FIG. 5C is a schematic cross-sectional view corresponding to FIG. 5B wherein a field effect transistor is connected to a core electrode according to another embodiment of the present invention. In the embodiment, a field effect transistor (FET) 370, for example, may be used to electrically connect the core electrode 110. The field effect transistor (FET) may be, for example, a N-type Metal-Oxide-Semiconductor (NMOS) field effect transistor (FET), a P-type Metal-Oxide-Semiconductor (PMOS) field effect transistor (FET), or a complementary Metal-Oxide-Semiconductor (CMOS) field effect transistor (FET), but not limited thereto. By further controlling the switch of the core electrode 110, an unnecessary power consumption can be reduced. In the embodiment, the substrate 102 is a semiconductor substrate as an example, or it may be replaced by a silicon-on-insulator (SOI) substrate, but not limited thereto. A first source/drain region 374 and a second source/drain region 376 are formed in the substrate 102. For example, it may be formed through doping by using an ion implantation process. A gate dielectric layer 373 and a gate electrode 372 are formed on the region between the first source/drain region 374 and the second source/drain region 376. Contact plugs 306, 308 and an insulating layer 142 are then formed on the substrate 102, and the contact plugs 306, 308 are respectively electrically connected to the first source/drain region 374 and the second source/drain region 376. The patterned conductive layer 170, including the core connecting line 310 electrically connected to the contact plug 306 and a contact pad electrically connected to the contact plug 308, is then formed on the insulating layer 142. The patterned conductive layer 170 may further include a manipulation selective line (not shown) electrically connected to the gate electrode 372. The manipulation selective line is substantially parallel to the core connecting line 310 to control the switch of the FET 370 through the manipulation selective line. For the subsequent processes, one may refer to the relative descriptions of FIG. 5B, and it will not be described in detail herein. When the manipulation units 100 are applied to a large array matrix, the FET 370 can switch off the manipulation units 100 to reduce unnecessary power consumption during non-manipulation periods, prevent liquid flow from affecting the control of target biological particles, and increase the probability of survival of the target biological particles.

Figure 6B:
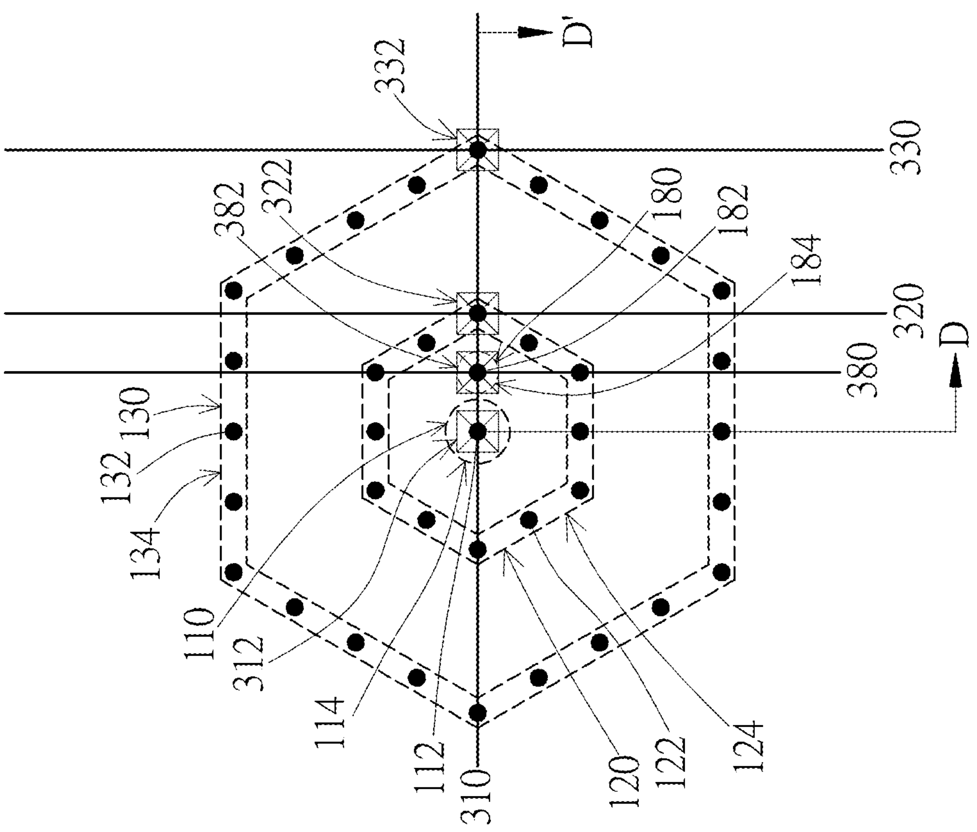
FIG. 6B is a schematic perspective view of a manipulation unit according to another embodiment of the present invention.
Figure 6A:
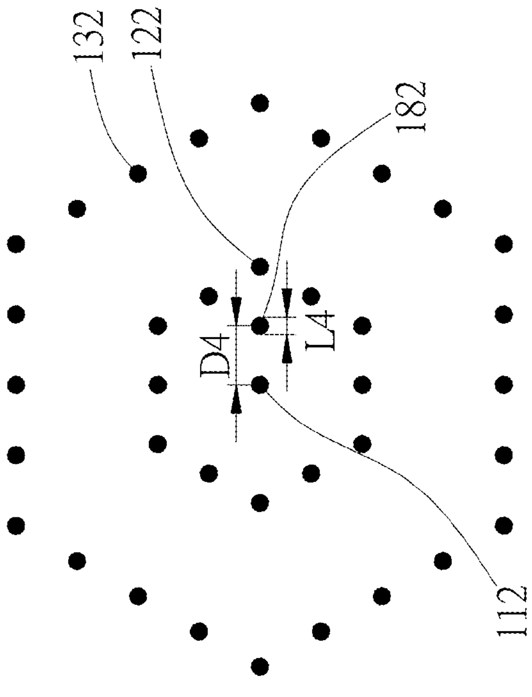
FIG. 6A is a schematic top view of a manipulation unit according to another embodiment of the present invention.
Figure 6C:
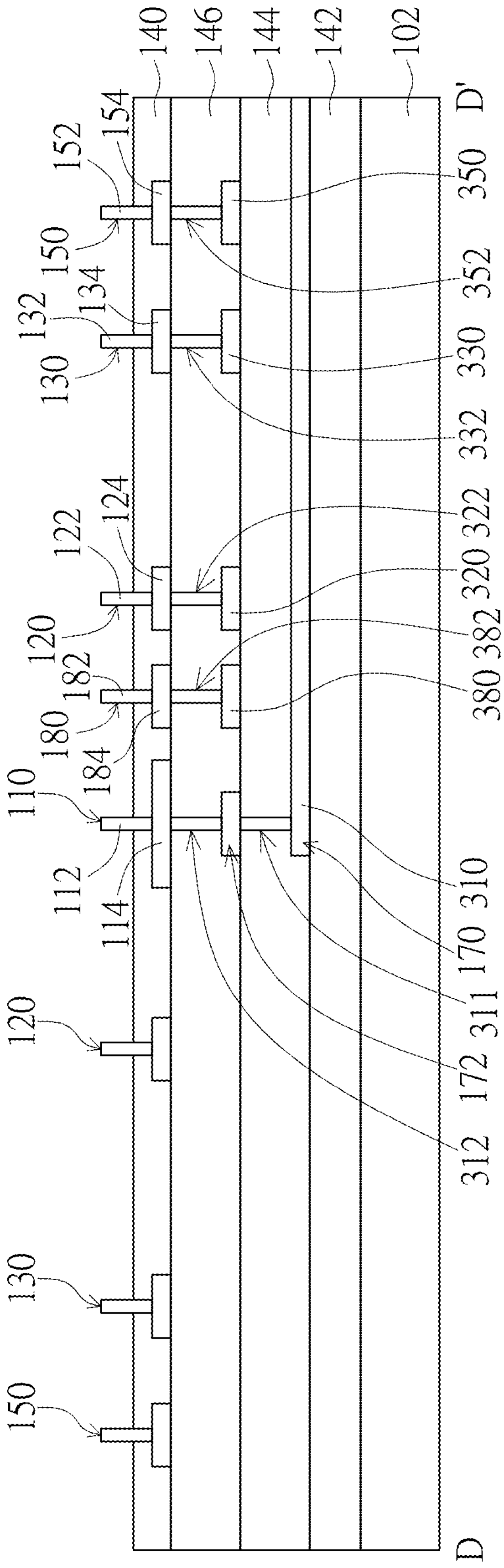
FIG. 6C is a schematic cross-sectional view along a cross-sectional line D-D' of FIG. 6B according to another embodiment of the present invention.

FIG. 6A is a schematic top view of a manipulation unit according to another embodiment of the present invention. FIG. 6B is a schematic perspective view of a manipulation unit according to another embodiment of the present invention. FIG. 6C is a schematic cross-sectional view along a cross-sectional line D-D' of FIG. 6B according to another embodiment of the present invention. In the embodiment, similar to the previous embodiments illustrated in FIGS. 1A to 1C, the same reference numbers can be correspondingly referred, but not limited thereto. Referring to FIGS. 6A, 6B and 6C, a single particle adsorbing electrode 180 may be optionally added between the core electrode 110 and the internal electrode 120 to improve the adsorption capacity of a single target biological particle.

Referring to FIGS. 6A, 6B and 6C, in the embodiment, in addition to at least comprising the substrate 102, the core electrode 110, the internal electrode 120, the external electrode 130, and the insulating layer 140, the manipulation unit 100 of the present invention may optionally further comprises a single particle adsorbing electrode 180. The core electrode 110, the internal electrode 120, the external electrode 130, the insulating layer 140 and the single adsorbing electrode 180 are all configured on the substrate 102. Regarding the detailed descriptions of the substrate 102, the core electrode 110, the internal electrode 120, the external electrode 130, and the insulating layer 140, one can refer to the descriptions of previous embodiments illustrated in FIGS. 1A to 1C, and it will not be described in detail herein.

Referring to FIGS. 6A, 6B and 6C, in the embodiment, the single particle adsorbing electrode 180 is configured on the substrate 102. The single particle adsorbing electrode 180 comprises at least one single particle working electrode 182, i.e., one or more single particle working electrodes 182. A single particle connecting electrode 184 can be optionally configured below the single particle working electrode 182 and electrically connected to the single particle working electrode 182. As shown in FIGS. 6A and 6B, the single particle working electrode 182 is configured adjacent to the core working electrode 112 and not limited in its quantity, as long as it can achieve a sufficient manipulating electric field. If the single particle adsorbing electrode 180 uses a plurality of single particle working electrodes 182, that means it can be electrically connected through the single particle connecting electrode 184. The single particle working electrode 182 may be a dot electrode. The shape of the dot electrode may be, for example, hemispherical, semi-ellipsoid, conical, cylindrical, hemispherical plus cylindrical, conical plus cylindrical, pyramidal, prismatic, pyramidal plus prismatic, star cone-shaped, star column-shaped, star cone-shaped plus star column-shaped, mushroom-shaped, etc., or of other suitable shape, but not limited thereto. Wherein the pyramidal shape may be in the shape of, for example, a triangular pyramid, quadrangular pyramid, pentagonal pyramid, hexagonal cone, octagonal cone, etc. The prismatic shape may be in the shape of, for example, a triangular prism, square prism, pentagonal prism, hexagonal prism, octagonal prism, etc. The star cone shape may be in the shape of, for example, a three-pointed star cone, four-pointed star cone, pentagram cone, hexagram cone, octagonal star cone, etc. The star column shape may be in the shape of, for example, a three-pointed star column, four-pointed star column, pentagram column, hexagram column, octagonal star pillar, etc. The above are just examples. The shape of the dot electrode can be properly selected according to product requirements, and the shape is not limited. In the embodiment, the single particle working electrode 182 may be a nano-grade cylindrical electrode as an example, but the size and the shape of the single particle working electrode 182 is not limited thereto. In a modified embodiment, if a plurality of single particle working electrodes 182 are used, the single particle connecting electrode 184 may be, for example, a disc electrode, a ring electrode or electrodes of other shapes, such that all of the single particle working electrodes 182 are connected.

Referring to FIGS. 6A, 6B and 6C, in the embodiment, the dot electrode of the single particle working electrode 182 may be a nano-grade cylindrical electrode as an example, but the size and shape of the single particle working electrode 182 is not limited thereto. The single particle working electrode 182 may be of a shape different from the core working electrode 112. There is a fourth average distance D4 between the single particle working electrode 182 and the core working electrode 112. For example, the geometric center of the core working electrode 112 can be used as the origin. The distance from the center point of each of the single particle working electrodes 182 to the geometric center of the core working electrode 112 is measured, and an average value is then calculated to obtain the fourth average distance D4. In the embodiment, the fourth average distance D4 between the core working electrode 112 and the single particle working electrodes 182 is smaller than the average diameter P of the biological particles, and the probability of at most one target biological particle being simultaneously adsorbed by the core working electrode 112 and the single particle working electrode 182 can be controlled. The ratio D4/P of the fourth average distance D4 between the core working electrode 112 and the single particle working electrode 182 to the average diameter P of the biological particles, for example, may be substantially between 0.01 and 0.95, and designed and adjusted according to the distribution of the manipulating electric field, but not limited thereto. Using this design, the probability of manipulating one single one target biological particle to approach and be adsorbed to the core working electrode 112 and the single particle working electrode 182 simultaneously can be further improved. Moreover, the single particle working electrode 182 has a fourth average diameter L4. Regarding this part, one may refer to related descriptions of the previously mentioned first average diameter L1 of the first working electrode 122, and it will not be described in detail herein. In addition, the single particle working electrode 182 itself has a second average height H2, and the portion of the single particle working electrode 182 protruding from the insulating layer 140 has a first average height H1. Regarding this part, one may refer to the related descriptions of the previously mentioned first working electrodes 122, and it will not be described in detail herein.

Referring to FIGS. 6B and 6C, in the embodiment, a via plug 382 is used as an example. The single particle connecting electrode 184 is electrically connected to a corresponding single particle connecting line 380 through the via plug 382 to apply manipulating voltage. This design can be applied to form a large array of a plurality of manipulation units 100, and it is suitable for the requirement of high-throughput manipulation.

Referring to FIGS. 6B and 6C, the single particle connecting electrode 184 of the single particle adsorbing electrode 180 may be electrically connected to the single particle connecting line 380 through the via plug 382. The single particle connecting line 380 may, for example, be designed along the row direction and electrically connected to a fourth AC voltage. The second connecting line 330, the first connecting line 320 and the single particle connecting line 380 are applied with manipulating voltages by using a time sequence control. For example, the second connecting line 330 may be applied with an AC voltage between +10V and −10V; the first connecting line 320 may be applied with an AC voltage between +5V and −5V; the single particle connecting line 380 may be applied with an AC voltage between +1V and −1V, but not limited thereto. The target biological particles are gradually attracted by dielectrophoretic force to approach the core electrode 110, achieving the purpose of adsorbing the target biological particles to the core electrode 110 and the single particle adsorbing on electrode 180 simultaneously.

In the embodiment, regarding the detailed manufacturing method of the manipulation unit 100, one may refer to the detailed descriptions of the previous embodiments illustrated in FIGS. 2A to 2C and the related descriptions of FIGS. 1 to 5C, and it will not be described in detail herein.

FIG. 7 is an operation flow chart according to another embodiment of the present invention. Regarding the manipulation unit 100, one may refer to the design of the previous embodiments in FIGS. 6A to 6C. In one example, the biological particles are cells with an average diameter P about 15 μm as an example. The external electrode average diameter T of the manipulation unit 100 may be designed to be 10 μm. For example, the first working electrodes 122 may be designed with 12 electrodes in a circular distribution. The first average distance D1 may be designed to be about 3 μm. The first average diameter L1 may be designed to be about 0.3 μm. The first average height H1 may be design to be about 0.3 μm. The second working electrodes 132 may be designed to be 24 electrodes in a circular distribution. The second average distance D2 may be designed to be about 2 μm. The second average diameter L2 may be designed to be about 0.3 μm. The first average height H1 may be design to be about 0.3 μm. The fourth average distance D4 between the single particle working electrode 182 and the core working electrode 112 may be designed to be about 1.5 μm. The fourth average diameter L4 may be designed to be 0.3 μm. The first average height H1 may be design to be about 0.3 μm. The above examples are just for illustration only, and not limited thereto.

Referring FIG. 7, firstly, a solution containing the target biological particles is disposed on the manipulation unit 100 (Step S110). In the embodiment, the target biological particles are yeast cells as an example. The solution can be a solution suitable for the survival of the yeast cells. The solution can be, for example, a suitable aqueous solution such as phosphate series buttered solution, but not limited thereto. In another embodiment, the solution can be other types of solutions. For example, the solution containing the target biological particles is dropped on the manipulation unit 100 using a dropper device, and a cover can be optionally used to assist the flow of the solution.

Next, manipulating voltages are applied to the core working electrode 112 and the second working electrodes 132, so that the target biological particles are attracted by dielectrophoretic force and gathered to the core working electrode 112 (Step S120). Then, the manipulating voltage applied to the second working electrode 132 is turned off, and manipulating voltages are applied to the core working electrode 112 and the first working electrode 122, such that the target biological particles are attracted by dielectrophoretic force and attached to the core working electrode 112 (Step S130). Regarding the steps S120 and S130, one may refer to the related descriptions of previous embodiments illustrated in FIG. 3, and it will not be described in detail herein.

Next, the manipulating voltages applied to the first working electrode 122 may be optionally turned off, and manipulating voltages are applied to the core working electrode 112 and the single particle working electrode 182, so that the target biological particles are attached to the core working electrode 112 by dielectrophoretic force. Because the spacing between the core working electrode 112 and the single particle working electrode 182 is smaller than the average diameter of the biological particles, only one single biological particle can be adsorbed to the core working electrode 112 and the single particle working electrode 182 simultaneously (Step S132). Using a time sequence voltage control, the single particle working electrode 182 may be applied with a fourth AC voltage between, for example, +1V and −1V, but not limited thereto. Since the fourth average distance D4 (for example, about 1.5 μm) between the single particle working electrode 182 and the core working electrode 112 is much smaller than the average diameter (for example, about 15 μm) of the target biological particles, it is more likely that only one single target biological particle can be stably adsorbed on the core working electrode 112 and the single particle working electrode 182 simultaneously, and other non-target biological particles will not be adsorbed and still suspended in the solution.

Next, the solution on the manipulation unit 100 is cleaned to remove the non-target biological particles and keep the target biological particles (Step S140). For example, a clean solution not containing any particle may be used to perform a cleaning operation to the manipulation unit 100 to remove non-target biological particles. Since the target biological particles are adsorbed to the core working electrode 112 and the single particle working electrode 182 simultaneously, the manipulating voltages are still applied during cleaning so that the target biological particles can be maintained in an adsorbed state and will not be washed out by the cleaning solution and fall off. Since the cleaning solution is also a cleaning solution suitable for the survival of biological particles, it is not likely to cause death or damage to the biological particles during the cleaning process.

Lastly, modification is carried out for the target biological particles (Step S152). Since only single one target biological particle is adsorbed on the manipulation unit 100, the subsequent electrofusion or electro-transfection manipulation inside the manipulation unit 100 can be more stably and precisely controlled. For example, a large quantity of a specific type modification molecules (such as hydrophilic molecules, DNA, RNA, protein, virus, antibody, drug particles, etc.) may be added to the solution by using a dropper device to perform modification. For example, the auxiliary external electrode 150 may be optionally configured outside the external electrode 130. The core electrode 110 may be applied with a constant voltage or ground. The auxiliary external electrode 150 or the external electrode 130 is applied with an electrofusion manipulating voltage or an electroporation manipulating voltage. The cell membranes are temporarily opened, so that the specific type of modification molecules is able to pass through the temporary holes in the cell membranes. This causes the target biological particles to proceed electrofusion or electro-transfection manipulation to achieve the effect of modification. The electrofusion voltage or the electroporation voltage can be a pulse voltage or an AC voltage. The voltage may be between, for example, 1V and 3000V, but not limited thereto. The frequency may be between 10 Hz and 100 MHz and can be adjusted according to the characteristic of the biological particles. Since the auxiliary external electrode 150 or the external electrode 130 can easily form an electric filed strength of about $10^6$ V/m, the target biological particles can be easily manipulated to proceed modification under a low voltage, and unnecessary joule heat is not likely to be produced, which causes death of the modified biological particles. Subsequently, a plurality of manipulation units 100 can be formed into an array arrangement to conduct modification and achieve the modified effect of high-throughput.

Figure 8A:
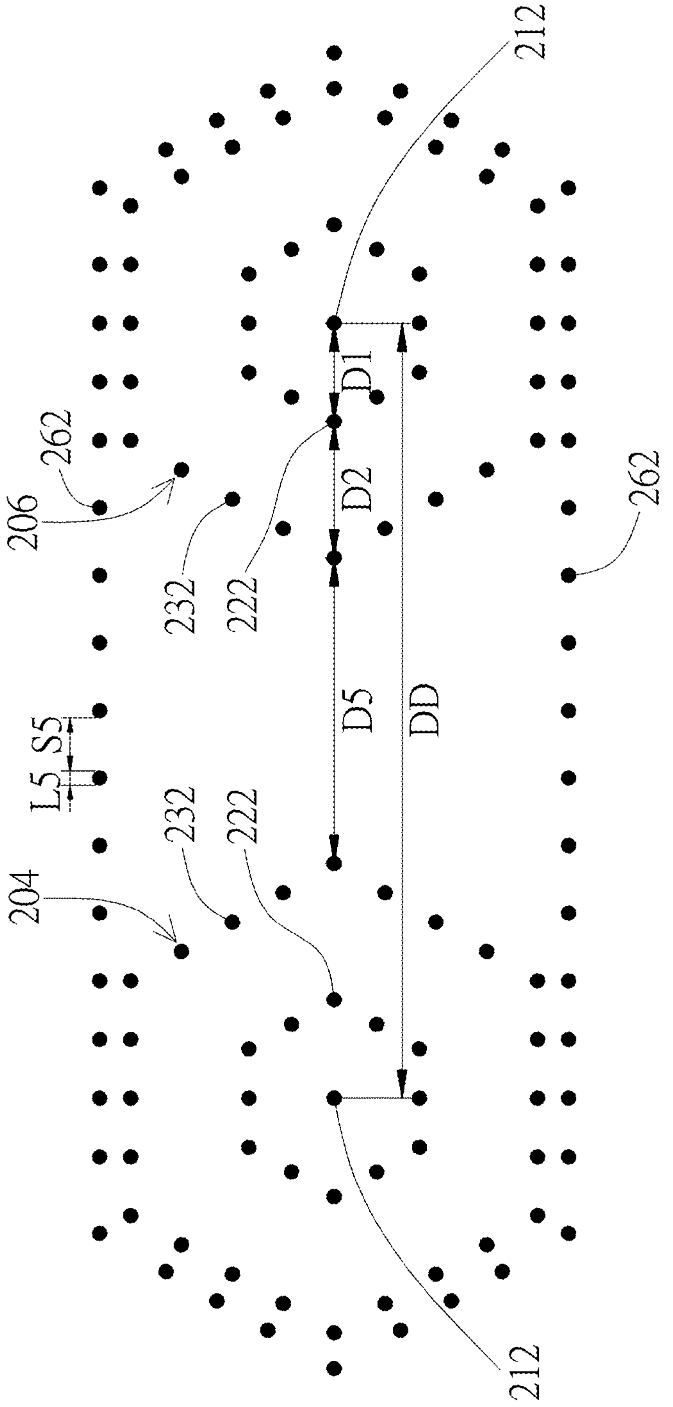
FIG. 8A is a schematic top view of a dual manipulation unit according to one embodiment of the present invention.
Figure 8B:
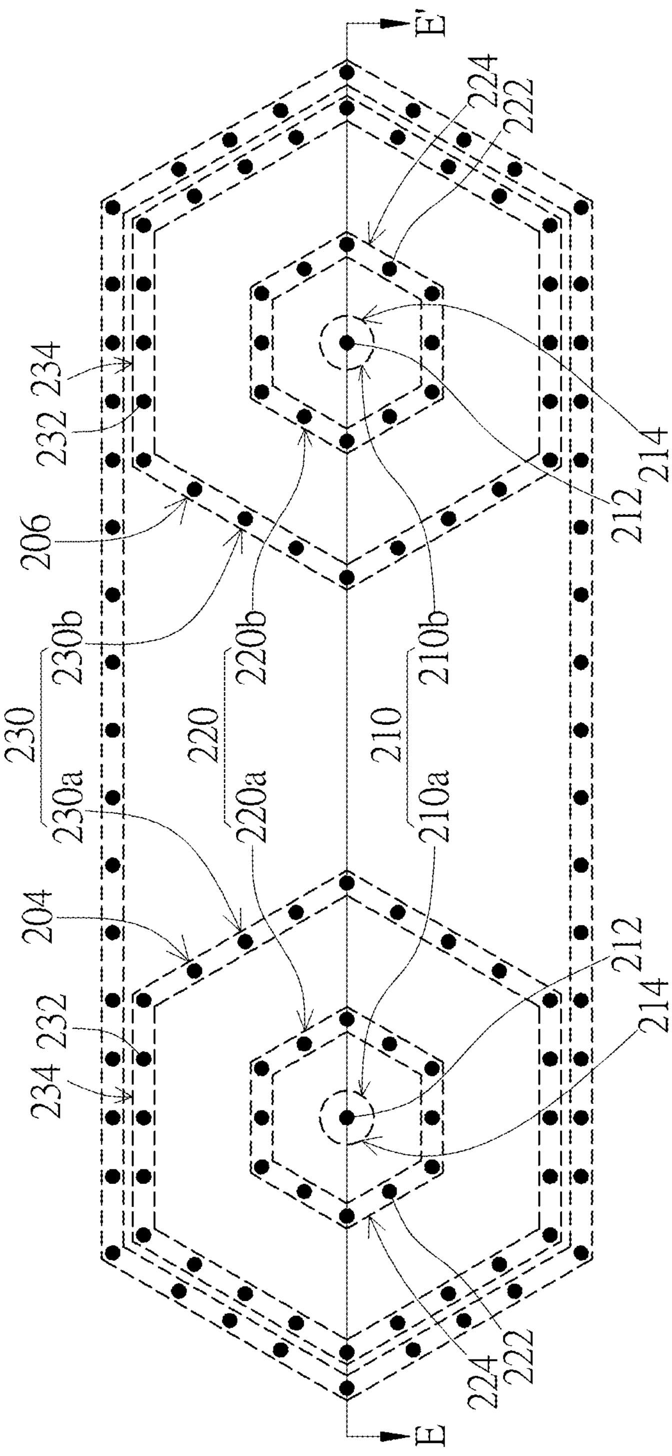
FIG. 8B is a schematic perspective view of a dual manipulation unit according to one embodiment of the present invention.
Figure 8C:
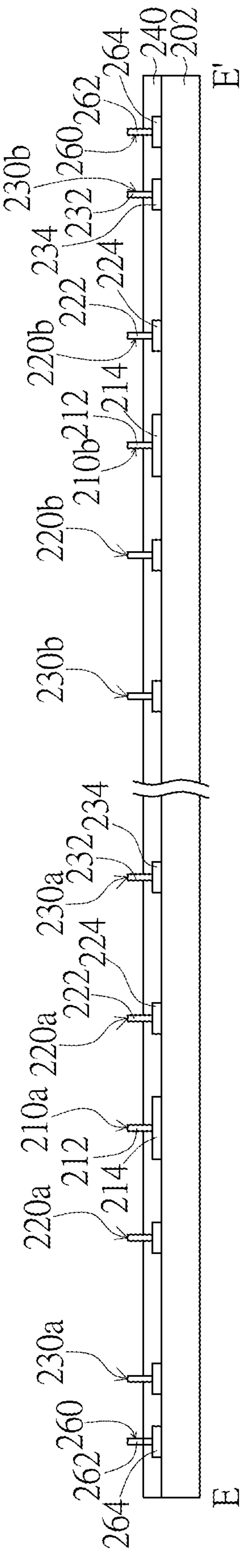
FIG. 8C is a schematic cross-sectional view along a cross-sectional line E-E' of FIG. 8B according to one embodiment of the present invention.

FIG. 8A is a schematic top view of a dual manipulation unit according to one embodiment of the present invention. FIG. 8B is a schematic perspective view of a dual manipulation unit according to one embodiment of the present invention. FIG. 8C is a schematic cross-sectional view along a cross-sectional line E-E' of FIG. 8B according to one embodiment of the present invention. In the embodiment, the dual manipulation unit 200 can be further applied to a cell-paired cell fusion or cell transfection, or other requirements for the manipulation of biological particles. Referring to FIGS. 8A, 8B and 8C, the dual manipulation unit 200 at least comprises a substrate 202, a first manipulation unit 204, a second manipulation unit 206, a dual electrode 260 and an insulating layer 240 that are all configured on the substrate 202. The first manipulation unit 204 and the second manipulation unit 206 are similar to the previously mentioned manipulation unit 100 and can be correspondingly referred, but not limited thereto. For the substrate 202 and the insulating layer 240, one can refer to the related descriptions of the substrate 102 and the insulating layer 140 in the previous embodiments illustrated in FIGS. 1A to 1C, and it will not be described in detail herein. The dual manipulation unit 200 comprises a pair of core electrodes 210 (including a first core electrode 210*a* and a second core electrode 210*b*), a pair of internal electrodes 220 (including a first internal electrode 220*a* and a second internal electrode 220*b*), a pair of external electrodes 230 (including a first external electrode 230*a* and a second external electrode 230*b*). The first manipulation unit 204 includes the first core electrode 210*a*, the first internal electrode 220*a* and the first external electrode 230*a* corresponding to each other. The second manipulation unit 206 includes the second core electrode 210*b*, the second internal electrode 220*b* and the second external electrode 230*b* corresponding to each other.

Referring to FIGS. 8A, 8B and 8C, each of the core electrodes 210 (the first core electrode 210*a* and the second core electrode 210*b*) respectively includes at least one core working electrode 212, i.e., one or more core working electrodes 212. A core connecting electrode 214 is optionally configured below the core working electrode 212 and electrically connected to the core working electrode 212. Each of the internal electrodes 220 (the first internal electrode 220*a* and the second internal electrode 220*b*) respectively includes a plurality of first working electrodes 222 and a first connecting electrode 224 electrically connected to all of the first working electrodes 222. Each of the external electrodes 230 (the first external electrode 230*a* and the second external electrode 230*b*) respectively includes a plurality of second working electrodes 232 and a second connecting electrode 234 electrically connected to all of the second working electrodes 232. Regarding the detailed descriptions of the pair of the core electrodes 210, the pair of the internal electrodes 220 and the pair of the external electrodes 230, one may refer to the related descriptions of the core electrode 110, the internal electrode 120 and the external electrode 130 of the manipulation unit 100 illustrated in FIGS. 1A to 1C, and it will not be described in detail herein.

Referring to FIGS. 8A, 8B and 8C, the dual electrode 260 is configured on the substrate 202. The dual electrode 260 can be one or more dual electrodes 260, but not limited thereto. The dual electrode 260 includes a plurality of dual working electrodes 262 and a dual connecting electrode 264 electrically connected to all of the dual working electrodes 262. As shown in FIGS. 8A and 8B, the second working electrodes 232 of the pair of the external electrodes 230 are substantially surrounded by the dual working electrodes 262 of the dual electrode 260. The plurality of the dual working electrodes 262 is not limited in its quantity, as long as it can achieve a sufficient manipulating electric field. In the embodiment, the distribution of the dual working electrodes 262 is exemplified by only an approximate long hexagonal distribution. The distribution of the dual working electrodes 262 may also be distributed in an approximate long oval, long rectangle, long octagon, etc., and not limited thereto.

The shape of each of the dual working electrodes 262 may be a dot electrode. Regarding the detailed descriptions of the dot electrode, one may refer to the related descriptions of the core working electrode 112, the first working electrodes 122 and the second working electrodes 132 of the previous FIGS. 1A to 1C, and it will not be described in detail herein. In the embodiment, forty-eight dual working electrodes 262 are used as an example. The dot electrode of the dual working electrodes 262 may be a nano-grade cylindrical electrode, for an example, but the size and shape of the dual working electrode 262 is not limited thereto. The dual working electrode 262 may be of a shape different from the core working electrode 212, the first working electrodes 222 or the second working electrodes 232. There is a fifth average distance D5 between the first manipulation unit 204 and the second manipulation unit 206. For example, the geometric centers of the two core working electrodes 212 can be used as measuring points. The distance between the geometric centers of the two core working electrodes 212 is measured, and thus a core average distance DD can be obtained. In addition, the geometric centers of the core working electrodes 212 in the manipulation units 204, 206 can be respectively used as the origin. The distance from the center point of each of the second working electrodes 232 in the manipulation units 204 and 206 to the corresponding geometric center of the core working electrodes 212 are measured, and an average value thereof is then calculated to obtain an external electrode average radius R2 (not shown). The fifth average distance D5 can be obtained by subtracting the external electrode average radius R2 (i.e., D1+D2) of the manipulation units 204, 206 from the core average distance DD. In other words, D5=DD−2R2=DD−2(D1+D2). The ratio D5/R2 of the fifth average distance D5 to the external electrode average radius R2 (i.e., D1+D2), for example, may be substantially between 0.01 and 10, and can be properly designed and adjusted according to the distribution of the manipulating electric field. Furthermore, the dual working electrodes 262 have a fifth average diameter L5, and a fifth average spacing S5 is formed between the dual working electrodes 262. The fifth average diameter L5 and the fifth average space S5 may be designed depending on the sizes and types of the reference target biological particles, but not limited thereto. The ratio L5/S5 of the fifth average diameter L5 to the fifth average spacing S5, for example, may be substantially between 0.01 and 10, and can be properly designed and adjusted according to the distribution of the manipulating electric field. Moreover, the part of the dual working electrodes 262 protruding from the surface of the insulating layer 240 has a first average height H1, and the dual working electrode 262 itself has a second average height H2. Regarding this part, one may refer to the related descriptions of the previously mentioned first working electrode 122, and it will not be described in detail herein.

Referring to FIGS. 8B and 8C, the dual connecting electrode 264 is configured below the dual working electrodes 262 and electrically connected to all of the dual working electrodes 262. The shape of the dual connecting electrode 264 may be designed corresponding to the distribution of the dual working electrodes 262 and can also be designed in another way, but not limited thereto. In the embodiment, the shape of the dual connecting electrode 264 is just a long hexagonal ring as an example. The shape of the dual connecting electrode 264 may also be, for example, a circular ring, an oval ring, a rectangular ring, a long octagonal ring, etc., but not limited thereto. Since the dual connecting electrode 264 is electrically connected to all of the dual working electrodes 262, the AC current received by the dual connecting electrode 264 can be rapidly transmitted to all of the dual working electrodes 262, such that the dual working electrodes 262 form the required manipulating electric field. Furthermore, in a modified embodiment, auxiliary external electrodes (not shown) may be respectively configured in the first manipulation unit 204 and the second manipulation unit 206, and respectively configured between the external electrodes 230 and dual working electrodes 262. Regarding the detailed descriptions of the auxiliary external electrode, one can refer to the related descriptions of previous embodiments illustrated in FIGS. 4A to 5C, and it will not be described in detail herein.

Figure 8D:
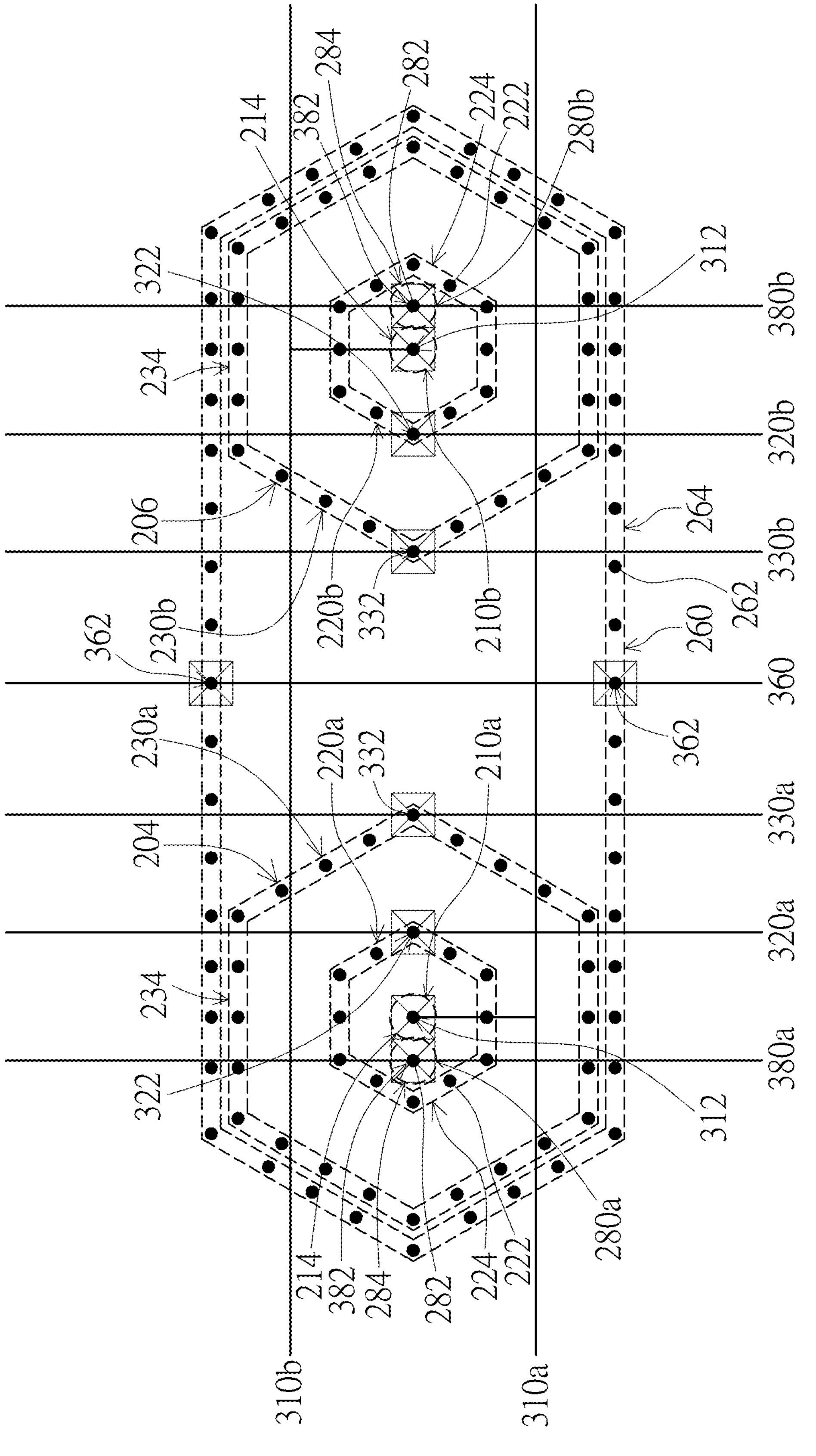
FIG. 8D is a schematic top view of a dual manipulation unit according to another embodiment of the present invention.

FIG. 8D is a schematic top view of a dual manipulation unit according to another embodiment of the present invention. Referring to FIG. 8D, in the embodiment, a via plug is used as an example to respectively connect the corresponding connecting lines for applying manipulating voltages. This design can be applied to form a large array of dual multiple manipulation units 200, suitable for the requirement of high throughput manipulation. In addition, in the embodiment, a pair of single particle adsorbing electrodes 280 (including a first single particle adsorbing electrode 280*a* and a second single particle adsorbing electrode 280*b*) may be optionally configured to improve pairing effect of the biological particles. The pair of single particle adsorbing electrodes 280 (including the first single particle adsorbing electrode 280*a* and the second single particle adsorbing electrode 280*b*) are configured on the substrate 202. The first single particle adsorbing electrode 280*a* is correspondingly configured between the first core electrode 210*a* and the first internal electrode 220*a*, and the second single particle adsorbing electrode 280*b* is correspondingly configured between the second core electrode 210*b* and the second internal electrode 220*b*. The first single particle adsorbing electrode 280*a* and the second single particle adsorbing electrode 280*b* respectively include a single particle working electrode 282 that protrudes from the insulating layer 240. Regarding the first single particle adsorbing electrode 280*a* and the second single particle adsorbing electrode 280*b*, one can refer to the detailed descriptions of the single particle adsorbing electrode 180 illustrated in FIGS. 6A to 6C, and it will not be described in detail herein. In the dual manipulation unit 200, the core connecting electrodes 214 of the first core electrode 210*a* and the second core electrode 210*b* can be respectively electrically connected to a core connecting line 310*a* and a core connecting line 310*b* through via plugs 312. The core connecting line 310*a* and the core connecting line 310*b* may, for example, be respectively designed along the row direction and electrically connected to a constant voltage or ground, but not limited thereto. The core connecting electrodes 214 of the first core electrode 210*a* and the second core electrode 210*b* may, for example, be respectively electrically connected to the core connecting line 310*a* and the core connecting line 310*b* through FETs, so that the first core electrode 210*a* and the second core electrode 210*b* can be further independently controlled, and this is beneficial to large-scale array matrix designs. Regarding the detailed connecting method of the FET, one may refer to the related descriptions of FIG. 5C, and it will not be described in detail herein. The first connecting electrodes 224 of the internal electrodes 220*a* and 220*b* may be electrically connected to first connecting lines 320*a* and 320*b* respectively through via plugs 322. The first connecting lines 320*a* and 320*b* may, for example, be designed along the column direction and respectively electrically connected to the first AC voltage. The second connecting electrodes 234 of the external electrodes 230*a* and 230*b* may be electrically connected to the second connecting lines 330*a* and 330*b* respectively through via plugs 332. The second connecting lines 330*a* and 330*b* may, for example, be designed along the column direction and electrically connected to the second AC voltage. Single particle connecting electrodes 284 of the first single particle adsorbing electrode 280*a* and the second single particle adsorbing electrode 280*b* may be electrically connected to the single particle connecting lines 380*a* and 380*b* respectively through via plugs 382. The single particle connecting lines 380*a* and 380*b* may, for example, be designed along the column direction and electrically connected to the fourth AC voltage. Regarding the single particle adsorbing electrodes 280*a* and 280*b*, one may refer to the detailed descriptions of the single particle adsorbing electrode 180 illustrated in FIGS. 6A to 6C. Regarding the single particle connecting lines 380*a* and 380*b*, one may refer to the detailed descriptions of the single particle connecting line 380 illustrated in FIGS. 6A to 6C, and it will not be described in detail herein.

The dual connecting electrode 264 of the dual electrode 260 may be electrically connected to the dual connecting line 360 through the via plugs 362. The dual connecting line 360 may be designed to extend along the column direction and be electrically connected to a pulse voltage or a fifth AC voltage, such as an electrofusion manipulation voltage. By using the design of a dual electrode 260, after the first manipulation unit 204 and the second manipulation unit 206 respectively adsorb the required target biological particles, the dual electrode 260 can be used to perform a cell electrofusion manipulation, so that cell fusion or cell transfection can be performed. Using the dual working electrodes 262, it is easy to provide enough manipulating electric field to open the cell membrane without causing excessive joule heat. During the cell manipulation process, cell death in the manipulating process can be prevented and success rate of cell fusion or cell transfection can be increased.

Regarding the manufacturing method of the dual manipulation unit 200, one may refer to the manufacturing method of the manipulation unit 100 illustrated in FIGS. 2A to 2C and the related descriptions of FIGS. 1 to 5C, and it will not be described in detail herein.

Figure 9:
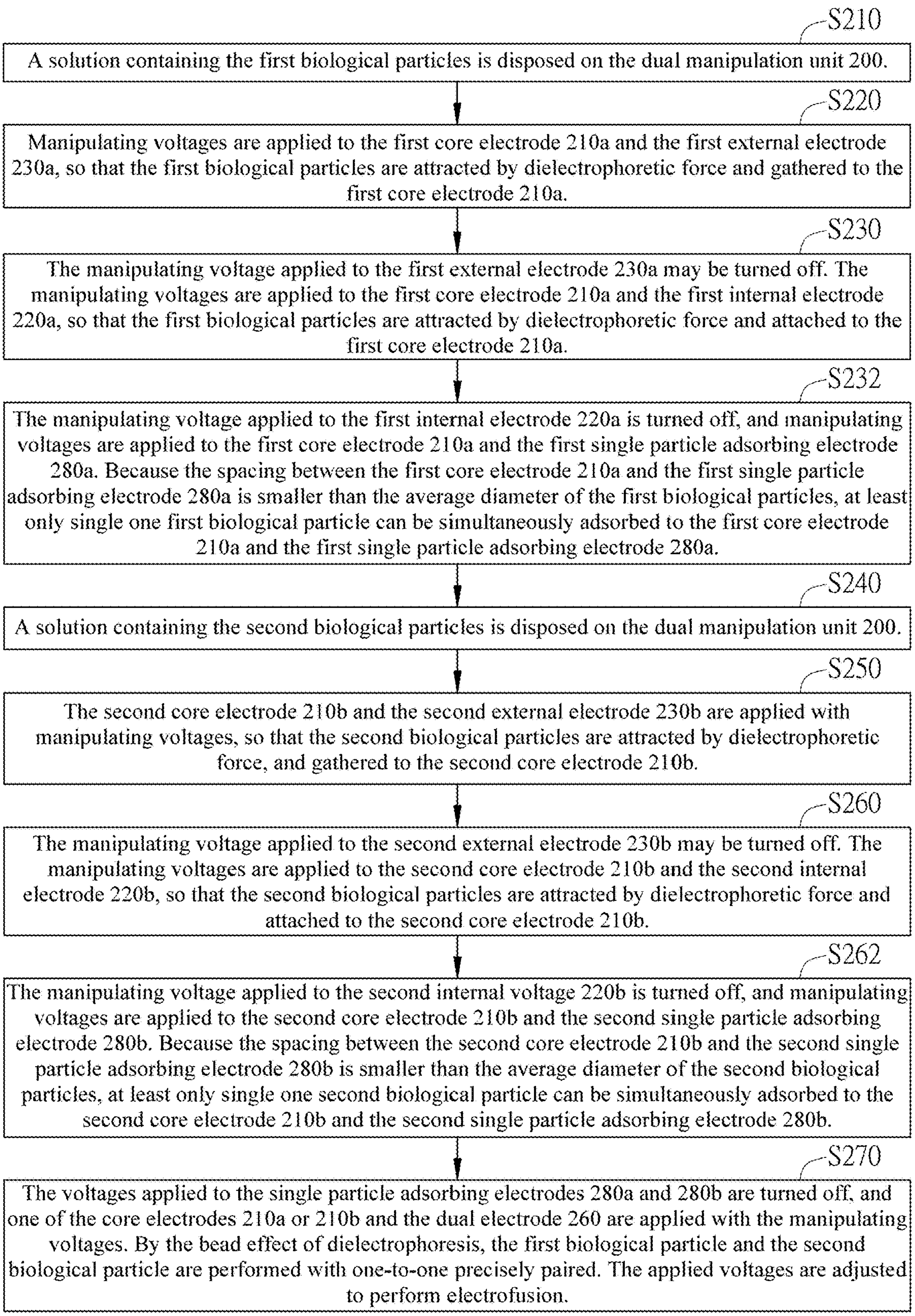
FIG. 9 is an operation flow chart according to another embodiment of the present invention.

FIG. 9 is an operation flow chart according to another embodiment of the present invention. Regarding the dual manipulation unit 200 of the present invention, one may refer to the designs of the previous embodiments illustrated in FIGS. 8A to 8D. In one example, the biological particles are cells with an average diameter P about 20 μm. The first biological particles may be, for example, yeast cells, *Escherichia coli, Pasteurella* or tumor cells, etc., and the second biological particles may be, for example, biological cells having antibodies, but not limited thereto. A person skilled in the art can choose suitable cells to manipulate depending on the requirements. The dual manipulation unit 200 may, for example, be designed with the external electrode average diameter T of the first manipulation unit 204 and the second manipulation unit 206 respectively to be about 20 μm. The fifth average distance D5 between the first manipulation unit 204 and the second manipulation unit 206 may be designed to be about 20 μm. The first average distance D1 of the first working electrodes may be designed to be about 5 μm. The first average diameter L1 may be designed to be about 0.2 μm. The first average spacing S1 may be designed to be about 2 μm. The first average height H1 may be designed to be about 0.4 μm. The second average distance D2 of the second working electrodes 232 may be designed to be about 5 μm. The second average diameter L2 may be designed to be about 0.2 μm. The second average spacing S2 may be designed to be about 2 μm. The first average height H1 may be designed to be about 0.4 μm. The second working electrodes 232 are close to and surrounded by the dual working electrodes 262. The fifth average diameter L5 may be designed to be about 0.2 μm. The fifth average spacing S5 may be designed to be about 2 μm. The first average height H1 may be designed to be about 0.4 μm. The above examples are just for illustration only, but not limited thereto.

Referring to FIG. 9, in the embodiment, the single particle adsorbing electrodes 280*a* and 280*b* can be optionally used to adsorb the first biological particle and the second biological particle, respectively. Since the spacings between the single particle adsorbing electrodes, 280*a*, 280*b* and the core electrodes 210*a*, 210*b* are quite small, and are respectively smaller than the average diameters of the first biological particle and the second biological particle, only single one first biological particle and only single one second biological particle can be adsorbed, and the accuracy of one-to-one pairing of electrofusion or electro-transfection can be improved.

Referring to FIG. 9, firstly, a solution containing the first biological particles is disposed on the dual manipulation unit 200 (Step S210). In the embodiment, the first biological particles are yeast cells with high cell division as an example, but not limited thereto. The solution can be a solution suitable for the survival of the yeast cells. The solution can be, for example, a suitable aqueous solution. In another embodiment, the solution can be other types of solutions, but not limited thereto. For example, the solution containing the first biological particles may be dropped on the dual manipulation unit 200 by using a dropper device, and a cover can be optionally used to assist the flow of the solution.

Next, manipulating voltages are applied to the first core electrode 210*a* and the first external electrode 230*a*, so that the first biological particles are attracted by dielectrophoretic force and gathered towards the first core electrode 210*a* (Step S220). For example, the first core electrode 210*a* may be applied with a constant voltage or ground. The first external electrode 230*a* may be applied with an AC voltage. The applied AC voltage may be a dielectrophoretic voltage, and the frequency may be between, for example, 10 Hz and 100 MHz, and can be adjusted according to the dielectrophoresis manipulation. The applied AC voltage, for example, may be between +10V and −10V, or even between +1V and −1V, and can be adjusted according to the dielectrophoresis manipulation. The positive dielectrophoresis (PDEP) can be formed by adjusting the frequency and phase of the applied AC voltage. Using yeast cells as an example, yeast cells in the solution are easily attracted by the dielectrophoretic force of PDEP, and the yeast cells are gathered towards the first core electrode 210*a*. Regarding how the dielectrophoretic force of PDEP can be adjusted, one can refer to the previously mentioned formula (1), and it will not be described in detail herein.

Next, the manipulating voltage applied to the first external electrode 230*a* may be turned off. Manipulating voltages are then applied to the first core electrode 210*a* and the first internal electrode 220*a* so that the first biological particles are attracted by dielectrophoretic force and attached to the first core electrode 210*a* (Step S230). After the manipulating voltage is turned off, for example, the first core electrode 210*a* may be applied with a constant voltage or ground, and the first internal electrode 220*a* may be applied with an AC voltage for PDEP. The applied AC voltage, for example, may be between +5V and −5V, or even between +1V and −1V, and can be adjusted according to the dielectrophoretic manipulation to make the first biological particle move inward from the first external electrode 230*a* to the first internal electrode 220*a* and enter into the first internal electrode 220*a* and eventually substantially adsorbed on the first core electrode 210*a*. If necessary, an AC voltage may be applied to the first core electrode 210*a* to further attract the first biological particle to be adsorbed on the first core electrode 210*a*. Since the spacing between the first core electrode 210*a* and the first internal electrode 220*a* is quite small, only one single layer of the first biological particles can be adsorbed by the first core electrode 210*a*. Then, a clean solution not containing any particle may be used to perform a cleaning operation to the dual manipulation unit 200 to remove excess first biological particles. Since the first biological particles are approximately adsorbed to the first core electrode 210*a*, manipulating voltages are still applied during cleaning so that the first biological particles can be maintained in an adsorbed state and not be washed out by the cleaning solution and fall off. Since the cleaning solution is also a cleaning solution suitable for the survival of first biological particles, it will not likely cause death or damage of the biological particles during the cleaning process.

Next, the manipulating voltage applied to the first internal electrode 220*a* is turned off, and manipulating voltages are applied to the first core electrode 210*a* and the first single particle adsorbing electrode 280*a*. Because the spacing between the first core electrode 210*a* and the first single particle adsorbing electrode 280*a* is smaller than the average diameter of the first biological particles, at most only one single first biological particle can be simultaneously adsorbed to the first core electrode 210*a* and the first single particle adsorbing electrode 280*a* (Step S232). In order to further make sure that only one single first biological particle is adsorbed, after the step S230, the first core electrode 210*a* and the first single particle adsorbing electrode 280*a* may be optionally applied with manipulation voltages. For example, the first single particle adsorbing electrode 280*a* may be applied with the fourth AC voltage between +1V and −1V, but not limited thereto. Since the average distance between the first single particle adsorbing electrode 280*a* and the first core electrode 210*a* is much smaller than the average diameter P of the first biological particle, it is more likely that only one single first biological particle can be stably and simultaneously adsorbed to the first core electrode 210*a* and the first single particle adsorbing electrode 280*a*. The other remaining first biological particles will not be adsorbed and will still be suspended in the solution. If necessary, the solution on the dual manipulation unit 200 can be cleaned to remove the remaining non-adsorbed first biological particles and only keep the one single first biological particle adsorbed on the single particle adsorbing electrode 280. Since the manipulating voltages are still applied during cleaning, the first biological particle can be maintained in an adsorbed state and will not be washed out by the cleaning solution and fall off. Since the cleaning solution is also a cleaning solution suitable for the survival of the first biological particles, it is not likely to cause death or damage to the first biological particles during cleaning process.

Next, a solution containing the second biological particles is disposed on the dual manipulation unit 200 (Step S240). In the embodiment, the second biological particles are cells with specific antibodies as an example. For example, the second biological particles may also be other biological cells with specific DNA, RNA, or protein to perform electrofusion or electro-transfection. The solution can be a solution that is suitable for survival of the antibody cells. The solution may be, for example, a suitable aqueous solution. In another embodiment, the solution can be other types of solutions, but not limited thereto. The solution containing the second biological particles may be dropped on the dual manipulation unit 200 using a dropper device, and a cover (not shown) may be optionally used to assist the flow of the solution. During the process of manipulating the second biological particles, the adsorbed first biological particles are continuously applied with the manipulating voltage to stabilize the adsorbed first biological particles and to prevent them from falling off.

Next, the second core electrode 210*b* and the second external electrode 230*b* are applied with manipulating voltages so that the second biological particles are attracted by dielectrophoretic force and gathered towards the second core electrode 210*b* (Step S250). For example, the second core electrode 210*b* may be applied with a constant voltage or ground. The second external electrode 230*b* may be applied with an AC voltage. The applied AC voltage may be a dielectrophoretic voltage, and the frequency, for example, may be between 10 Hz and 100 MHz, and can be adjusted according to the dielectrophoresis manipulation. The applied AC voltage, for example, may be between +10V and −10V, or even between +1V and −1V, and can be adjusted according to the dielectrophoresis manipulation. Positive dielectrophoresis (PDEP) can be formed by adjusting the frequency and phase of the applied AC voltage. Using antibody cells as an example, antibody cells in the solution are easily attracted by the dielectrophoretic force of PDEP, making them gather towards the second core electrode 210*b*. The dielectrophoretic force of PDEP can be adjusted by referring to the previously mentioned formula (1), and it will not be described in detail herein.

Next, the manipulating voltage applied to the second external electrode 230*b* is turned off, and manipulating voltages are applied to the second core electrode 210*b* and the second internal electrode 220*b*, so that the second biological particles are attracted by dielectrophoretic force and attached to the second core electrode 210*b* (Step S260). After the manipulating voltage is turned off, the second core electrode 210*b* may be applied with a constant voltage or ground, and the second internal electrode 220*b* may be applied with an AC voltage for PDEP, for example, to make the second biological particle move from the second external electrode 230*b* towards the second internal electrode 220*b* and enters into the second internal electrode 220*b*, and finally substantially adsorb on the second core electrode 210*b*. If necessary, an AC voltage may be applied to the second core electrode 210*b* to further attract the second biological particle to adsorb on the second core electrode 210*b*. Since the spacing between the second core electrode 210*b* and the second internal electrode 220*b* is quite small, at most only one single layer of the second biological particles can be adsorbed by the second core electrode 210*b*. Then, a cleaning solution not containing any particle is used to perform a cleaning operation to the dual manipulation unit 200 to remove the excess second biological particles. Since the second biological particles are adsorbed on the second core electrode 210*b*, the manipulating voltages are still applied during cleaning, so that the second biological particles can be maintained in an adsorbed state and will not be washed out by the cleaning solution and fall off. Since the cleaning solution is also a clean solution suitable for the survival of second biological particles, it is not likely to cause death or damage of the biological particles during the cleaning process.

Next, the manipulating voltage applied to the second internal voltage 220*b* is turned off, and manipulating voltages are applied to the second core electrode 210*b* and the second single particle adsorbing electrode 280*b*. Because the spacing between the second core electrode 210*b* and the second single particle adsorbing electrode 280*b* is smaller than the average diameter of the second biological particles, at most only single one second biological particle can be simultaneously adsorbed to the second core electrode 210*b* and the second single particle adsorbing electrode 280*b* (Step S262). In order to further make sure that only single one second biological particle is adsorbed after the step S260, the second core electrode 210*b* and the second single particle adsorbing electrode 280*b* may be optionally applied with the fourth AC voltage between +1V and −1V, but not limited thereto. Since the average distance between the second single particle adsorbing electrode 280*b* and the second core electrode 210*b* is much smaller than the average diameter P of the second biological particle, it is more likely that only single one second biological particle can be stably and simultaneously adsorbed to the second core electrode 210*b* and the second single particle adsorbing electrode 280*b*, and the excess second biological particles will not be adsorbed and will still remain suspended in the solution. The solution on the dual manipulation unit 200 can be optionally cleaned to remove the remaining non-adsorbed first biological particles and the second biological particles and only keep the single one first biological particle adsorbed on the first single particle adsorbing electrode 280*a* and the single one second biological particle adsorbed on the second single particle adsorbing electrode 280*b*. Since the manipulating voltages are still applied during cleaning, the first biological particle and the second biological particle can be maintained in an adsorbed state and will not be washed out by the cleaning solution and fall off, and death or damage to the first biological particle and the second biological particle is not likely to occur during the cleaning process.

Since the first biological particle and the second biological particle are respectively adsorbed on the first manipulation unit 204 and the second manipulation unit 206, the subsequent electrofusion manipulation can be stably and precisely controlled inside the dual manipulation unit 200. Lastly, the voltages applied to the single particle adsorbing electrodes 280*a* and 280*b* are turned off, and one of the core electrodes 210*a* or 210*b* and the dual electrode 260 are applied with the manipulating voltages. By the bead effect of dielectrophoresis, the first biological particle and the second biological particle go through one-on-one precise pairing, and the applied voltages are adjusted to perform electrofusion (Step S270). After the manipulating voltages of the single particle adsorbing electrodes 280*a*, 280*b* are turned off, the electrofusion manipulation is performed. A constant voltage or ground may be applied to either the first core electrode 210*a* or the second core electrode 210*b*. For example, it is the first core electrode 210*a* that is applied the constant voltage or ground.) The dual electrode 260 is applied with an electrofusion voltage to merge two monocytes into one apocyte, so that electrofusion is performed to the first biological particle and the second biological particle. The electrofusion voltage may be a pulse voltage or an AC voltage. The voltage, for example, may be between 1V and 3000V, but not limited thereto. The frequency, for example, may be between 10 Hz and 100 MHz, and can be adjusted according to the characteristics of the biological particles. Since the dual electrode 260 can easily form an electric field of about $10^6$V/m, and the first biological particle and the second biological particle are quite close, the first biological particle and the second biological particle can be easily manipulated to perform electrofusion, making the cell pairing rate significantly improve and death to the fused cells less likely. Since the distance between the first biological particle and the second biological particle is quite close, only a relatively small voltage needs to be applied to form an electric field with sufficient strength during electrofusion. As a result, electrofusion can be rapidly performed to the first biological particle and the second biological particle. Moreover, during the electrofusion manipulation process, unnecessary joule heat can be isolated, which further reduces death rate of the manipulated biological particles and, on the other hand, increases success rate of electrofusion manipulation.

Furthermore, since the dual connecting electrode 264 of the dual electrode 260 is covered by the insulating layer 240 that has considerable excellent electrical and thermal insulation properties, the unnecessary joule heat generated by the dual connecting electrode 264 can be effectively isolated, preventing the transfer of the unnecessary joule heat to the nearby manipulating solution. This further reduces the death rate of the biological particles. At the same time, thermal convection or thermal turbulence in the nearby solution due to joule heat can be prevented, and thus the success rate of electrofusion manipulation can be relatively increased.

Figure 10:
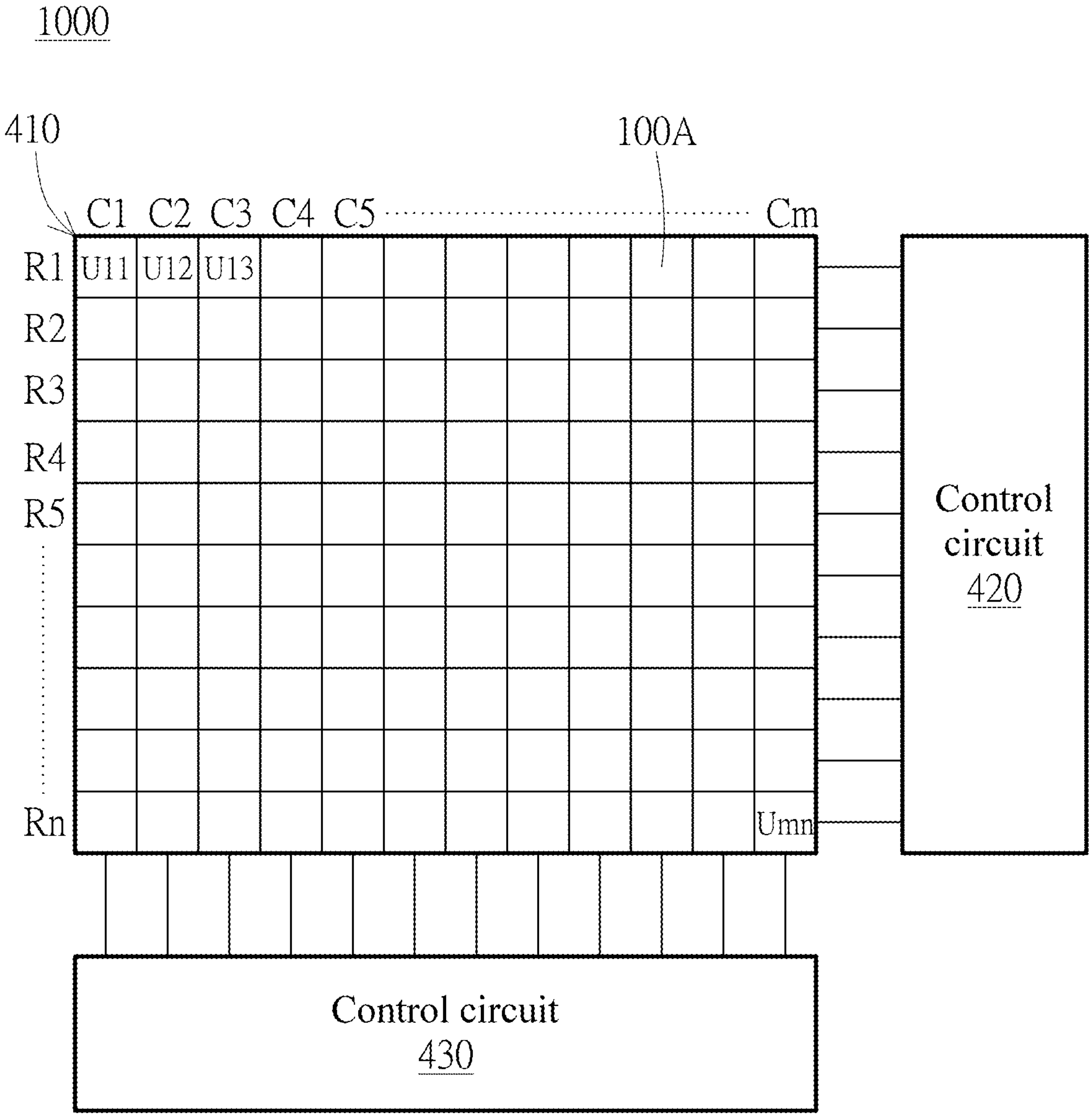
FIG. 10 is a schematic structural view of a manipulation equipment according to one embodiment of the present invention.
Figure 11:
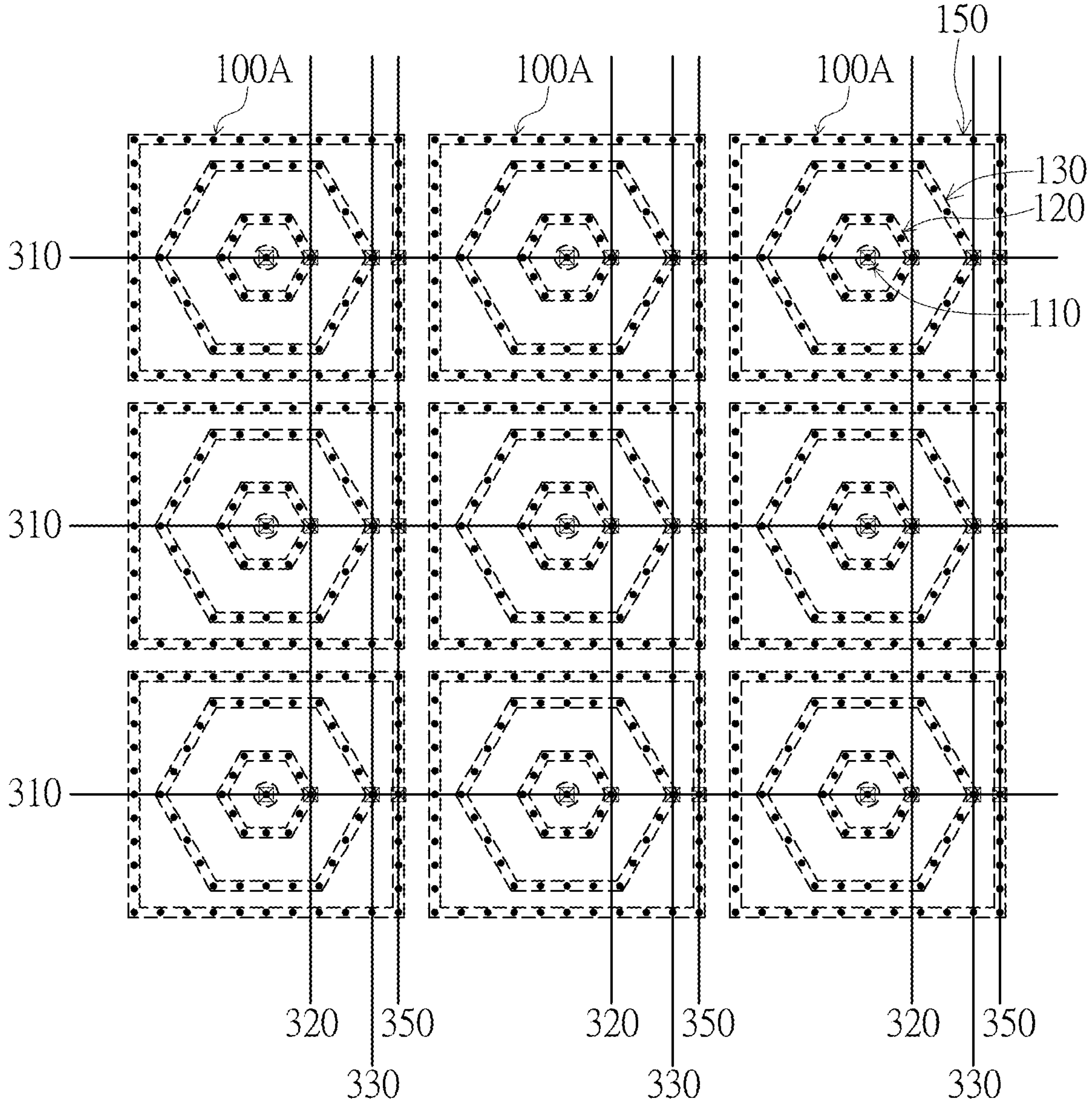
FIG. 11 is a schematic structural view of a local enlargement corresponding to FIG. 8 according to one embodiment of the present invention.

FIG. 10 is a schematic structural view of a manipulation equipment according to one embodiment of the present invention. FIG. 11 is a schematic structural view of a local enlargement corresponding to FIG. 8 according to one embodiment of the present invention. Referring to FIGS. 10 and 11, the manipulation units 100 of the present invention can be applied to manufacture a matrix array arranged manipulation equipment 1000. In particular, a large matrix array arranged manipulation equipment 1000 can be manufactured for high flux biological particle manipulation. The manipulation equipment 1000 can simultaneously manipulate large numbers of biological particles, and the yield can be relatively increased and the manipulation cost can be reduced. If the manipulation units 100 and the manipulation equipment 1000 of the present invention use FETs, which can be, for example, manufactured by a CMOS logic process, a high throughput nanoelectrode array matrix and combinational designs can be easily completed. The CMOS logic process is well known by a person skilled in the art, and the circuits can be appropriately designed according to product requirements, and it will not be described in detail herein. On the other hand, CMOS logic control circuits can be further applied in a programmable control method for manipulating individual circuit electrode of multiple nanoelectrode matrix combinations and ultimately achieve the perfect situation of precise high flux control of the biological particles while not destroying the biological particles.

Referring to FIGS. 1A, 1B, 1C, 10 and 11, the manipulation equipment 1000 at least comprises a manipulation array 410, a first control circuit 420 and a second control circuit 430. The connection lines between the manipulation array 410 and the first control circuit 420, and the connection lines between the manipulation array 410 and the second control circuit 430 are just for indicating electrical connections and do not limit the number of the connection lines. The manipulation array 410 includes a plurality of array arranged manipulation units 100A all configured on the substrate 102. Each of the manipulation units 100A at least comprises a core electrode 110, an internal electrode 120, an external electrode 130 and an insulating layer 140. The core electrode 110, the internal electrode 120 and the external electrode 130 in each of the manipulation units 100A are configured corresponding to each other. In addition, each of the manipulation units 100A may be optionally configured with a corresponding auxiliary external electrode 150. The core electrode 110 at least comprises a core working electrode 112. The internal electrode 120 at least comprises a plurality of first working electrodes 122 and a first connecting electrode 124. The external electrode 130 at least comprises a plurality of second working electrodes 132 and a second connecting electrode 134. All of the first connecting electrodes 124 and the second connecting electrodes 134 are covered by the insulating layer 140, and all of the core working electrodes 112, the first working electrodes 122 and the second working electrodes 132 protrude from the insulating layer 140. Each core working electrode 112 is surrounded by the corresponding first working electrodes 122 of each internal electrode 120. The first working electrodes 122 of each internal electrode 120 are surrounded by the corresponding second working electrode 132 of each external electrode 130. Each core electrode 110 is encircled by the corresponding first connecting electrode 124. Each first connecting electrode 124 is encircled by the corresponding second connecting electrode 134. Regarding the detailed descriptions of the manipulation unit 100A, one can refer to the manipulation unit 100 of previous embodiments, and it will not be described in detail herein. The manipulation units 100A are arranged in rows and columns to form a (m*n) matrix in which m>0 and n>0. Wherein, m columns of manipulation units 100A are orderly arranged in columns C1, C2, C3, . . . , Cm, and n rows of manipulation units 100A are orderly arranged in rows R1, R2, R3, . . . , Rn. Accordingly, the arranged matrix of manipulation units 100A can be respectively marked as manipulation units U11, U12, U13, . . . , Umn.

Referring to FIGS. 10 and 11, each manipulation unit row Rn in the row arranged manipulation units 100A can be respectively electrically connected to the first control circuit 420. For example, each core connecting line 310 respectively can be electrically connected to the core electrode 110 in each manipulation unit row Rn to apply with a constant voltage or ground. The switch of the core electrode 110 of each manipulation unit row Rn can be controlled by, for example, time sequence control of the first control circuit 420. On the other hand, each manipulation unit column Cm in the column arranged manipulation units 100A respectively can be electrically connected to the second control circuit 430. For example, each first connecting line 320 can be respectively electrically connected to the internal electrode 120 in each manipulation unit column Cm to apply with a first AC voltage for manipulating the biological particles. Similarly, each second connecting line 330 can be respectively electrically connected to the external electrode 130 in each manipulation unit column Cm to apply with a second AC voltage for manipulating the biological particles. In addition, each third connecting line 350 can be optionally used to respectively electrically connect to the auxiliary external electrode 150 in each manipulation unit column Cm to apply with a third AC voltage for manipulating the biological particles. The switches of the auxiliary external electrode 150, the external electrode 130 and the internal electrode 120 in each manipulation unit column Cm can be controlled by time sequence control of the second control circuit 430. The dielectrophoretic switch of each manipulation unit Umn can be controlled by the first control circuit 420 and the second control circuit 430, so that each manipulation unit Umn can precisely manipulate the biological particles. When the manipulation equipment 1000 is applied to a large array arranged matrix of the manipulation units 100A, the via plugs 311, 312, 322, 332, and 352 in FIGS. 5A and 5B can be used for the manipulation units 100A to improve the capability of large-scale design of the manipulation equipment 1000. The FETs in FIG. 5C can also be used to further precisely control the manipulation of each manipulation unit 100A. The FETs and related connecting lines can be manufactured by a CMOS logic process, and each manipulation unit 100A can be manipulated by using a programmable control method, so that the effect of high throughput manipulation can be easily achieved.

Figure 12:
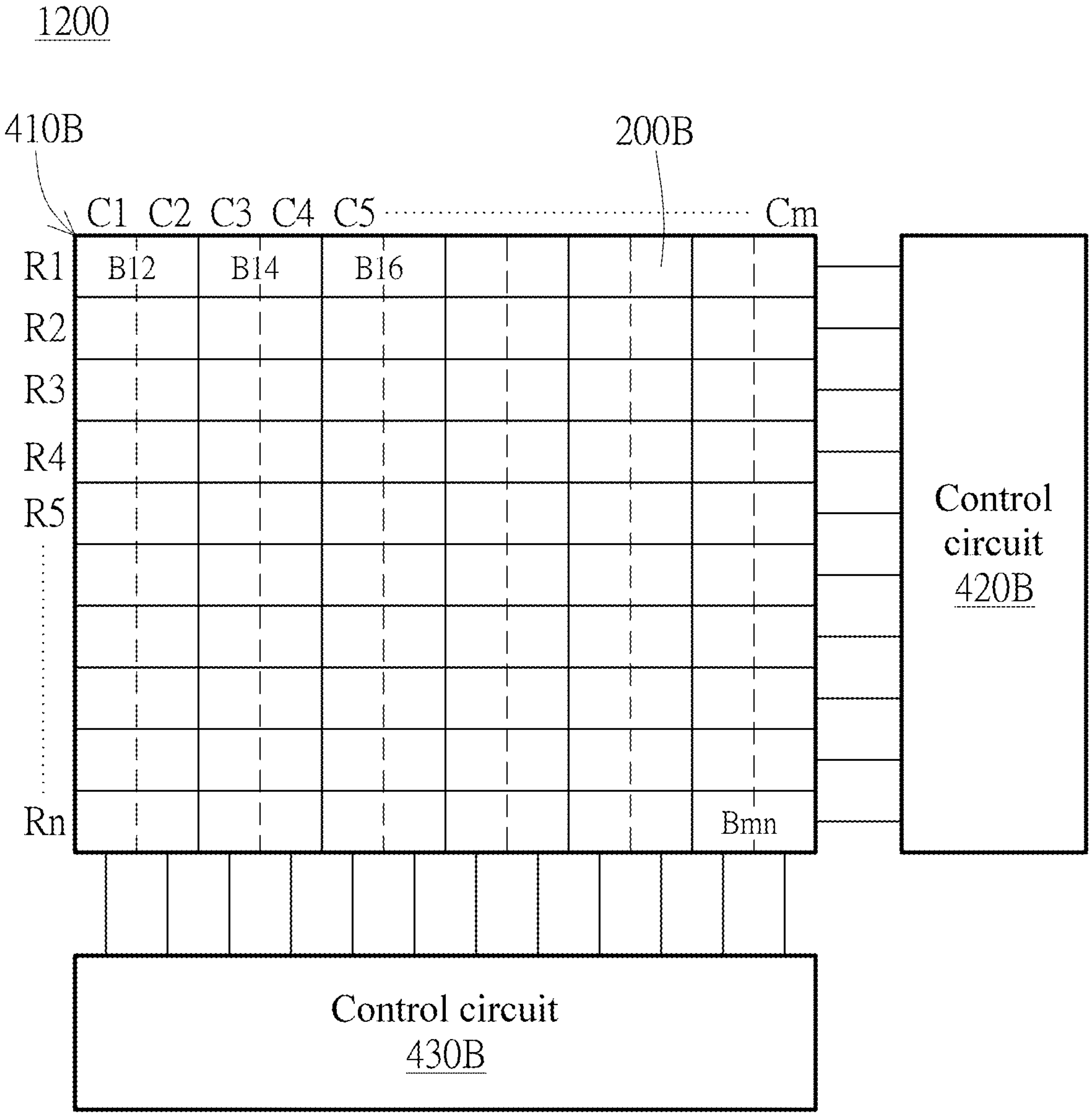
FIG. 12 is a schematic structural view of a manipulation equipment according to another embodiment of the present invention.
Figure 13:
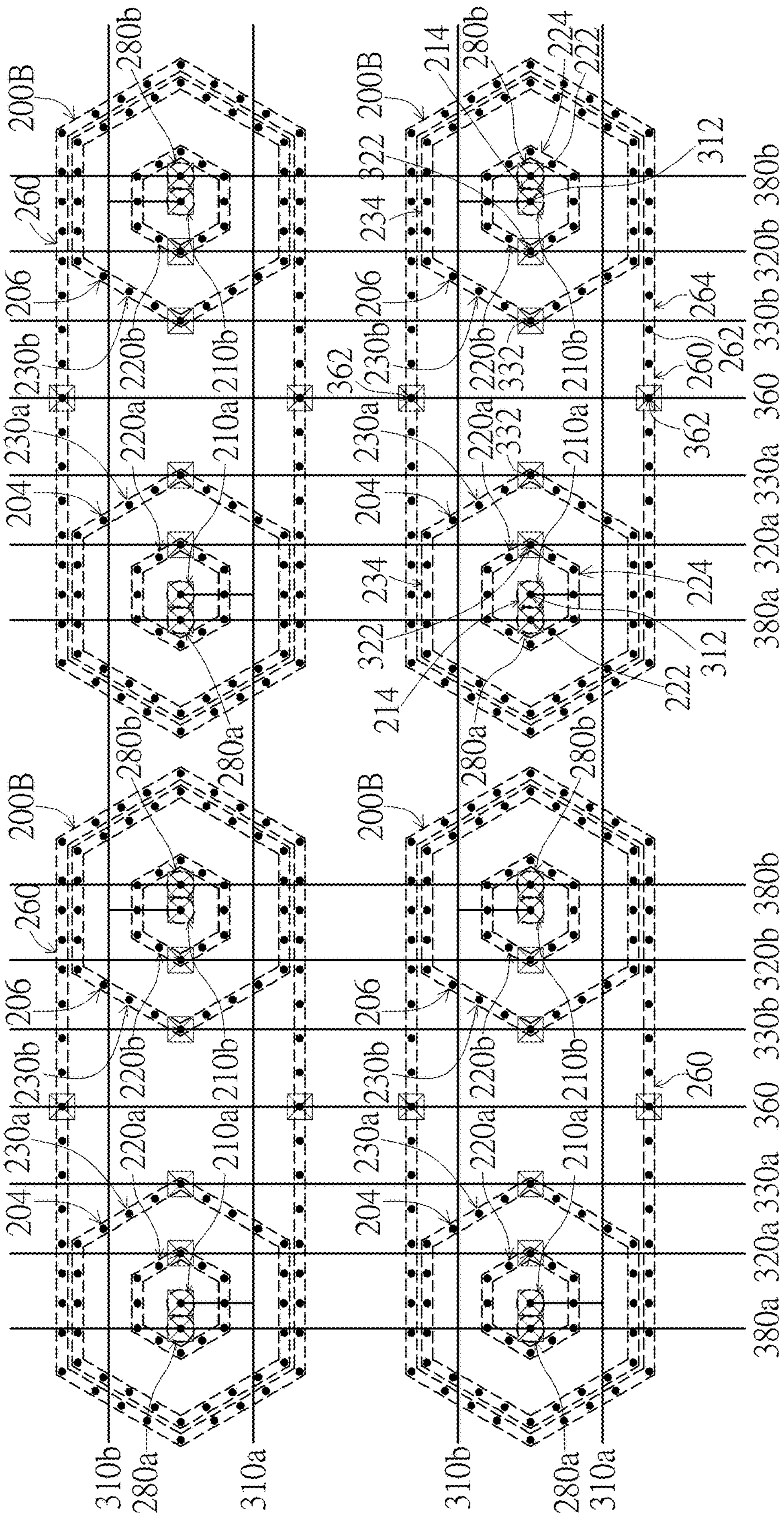
FIG. 13 is a schematic structural view of a local enlargement corresponding to FIG. 12 according to another embodiment of the present invention.

FIG. 12 is a schematic structural view of a manipulation equipment according to another embodiment of the present invention. FIG. 13 is a schematic structural view of a local enlargement corresponding to FIG. 12 according to another embodiment of the present invention. Referring to FIGS. 12 and 13, the dual manipulation units 200 of the present invention can be applied to a matrix array arranged manipulation equipment 1200. In particular, a large matrix array arranged manipulation equipment 1200 can be manufactured for the electro-transfection or electrofusion of high throughput biological particles. The manipulation equipment 1200 can simultaneously manipulate large numbers of biological particles, and the success rate of electro-transfection or electrofusion can be increased. If the dual manipulation units 200 and the manipulation equipment 1200 of the present invention use FETs, which can be manufactured by a CMOS logic process, for example, a high throughput nanoelectrode array matrix and combinational designs can be easily completed. The CMOS logic process is well known by a person skilled in the art, and the circuits can be appropriately designed according to the product requirements, and it will not be described in detail herein. On the other hand, CMOS logic control circuits can be further applied in a programmable control method for manipulating individual circuit electrode of multiple nanoelectrode matrix combinations and ultimately achieve the perfect situation of precise high flux control of the biological particles and improving the success rate of electro-transfection and electrofusion while not destroying the biological particles.

Referring to FIGS. 8D, 12 and 13, the manipulation equipment 1200 at least comprises a dual manipulation array 410B, a first control circuit 420B and a second control circuit 430B. The connection lines between the dual manipulation array 410B and the first control circuit 420B, and the connection lines between the dual manipulation array 410B and the second control circuit 430B are just for indicating electrical connections and do not limit the number of the connection lines. The dual manipulation array 410B includes a plurality of array arranged dual manipulation units 200B all configured on the substrate 102. Each of the dual manipulation units 200B at least comprises a first manipulation unit 204, a second manipulation unit 206, a dual electrode 260 and an insulating layer 240. In addition, each of the first manipulation unit 204 and the second manipulation unit 206 may be optionally configured with a corresponding first single particle adsorbing electrode 280*a* and a corresponding second single particle adsorbing electrode 280*b*. Regarding the detail descriptions of the dual manipulation unit 200B, one can refer to the dual manipulation unit 200 of previous embodiments, and it will not be described in detail herein. The dual manipulation units 200B are arranged in rows and columns to form a (m*n) matrix in which m>0 and n>0. Wherein, m columns of dual manipulation units 200B are orderly arranged in columns C1, C2, C3, . . . , Cm, and n rows of dual manipulation units 200B are orderly arranged in rows R1, R2, R3, . . . , Rn. Accordingly, the array of arranged dual manipulation units 200B can be respectively marked in manipulation units B12, B14, B16, . . . , Bmn.

Referring to FIGS. 8D, 12 and 13, each dual manipulation unit row Rn in the row arranged dual manipulation units 200B can be respectively electrically connected to the first control circuit 420B. For example, each of the core connecting lines 310*a*, 310*b* can be respectively electrically connected to the core electrodes 210*a*, 210*b* in each dual manipulation unit row Rn, for example, can be controlled by, for example, time sequence control of the first control circuit 420B. On the other hand, each dual manipulation column Cm in the column arranged dual manipulation units 200B can be respectively electrically connected to the second control circuit 430B. For example, each of the first connecting lines 320*a*, 320*b* respectively can be electrically connected to the internal electrodes 220*a*, 220*b* in each dual manipulation unit column Cm to apply with a first AC voltage for manipulating the first biological particles and the second biological particles. Similarly, each of the second connecting lines 330*a*, 330*b* can be respectively electrically connected to the external electrodes 230*a*, 230*b* in each dual manipulation unit column Cm to apply with a second AC voltage for manipulating the first biological particles and the second biological particles. In addition, each of the single particle connecting lines 380*a*, 380*b* can be optionally used to respectively be electrically connected to the single particle adsorbing electrodes 280*a*, 280*b* in each dual manipulation column Cm to apply with a fourth AC voltage for adsorbing the corresponding first biological particles and corresponding second biological particles to improve one-on-one precise pairing. Furthermore, each dual connecting line 360 can be optionally used to respectively electrically connect to the dual electrodes 260 in each secondary dual manipulation column Cm to apply with a pulse voltage or a fifth AC voltage for performing electro-transfection or electrofusion. The switches of the external electrodes 230*a* 230*b* and the internal electrodes 220*a*, 220*b* in each dual manipulation unit column Cm can be controlled by, for example, time sequence control of the second control circuit 430B. The dielectrophoretic switch of each dual manipulation unit Bmn can be controlled by the first control circuit 420B and the second control circuit 430B, so that each dual manipulation unit Bmn can precisely manipulate the first biological particles and the second biological particles to perform electro-transfection or electrofusion. When the manipulation equipment 1200 is applied to a large-array arranged matrix of the dual manipulation units 200B, the via plugs 312, 322, 332, 362, and 382 in FIG. 8D can be used for the dual manipulation units 200B to improve the capability of large-scale design of the manipulation equipment 1200. Moreover, The FETs in FIG. 5C can also be used to control the manipulation of each dual manipulation unit 200B further precisely. The FETs and related connecting lines can be manufactured by a CMOS logic process, and each dual manipulation unit 200B can be manipulated by using a programmable control method, so that the effect of high throughput manipulation can be easily achieved.

In order to further check the manipulating electric field of the manipulation unit 100 of the present invention, a physics simulation analysis software COMSOL Multiphysics® is used by the present invention to perform simulation analysis for the manipulation unit 100. The present invention uses three different experimental examples to compare with a conventional example. Through the comparison, one can see that the manipulation unit 100 of the present invention can achieve a high-performance manipulating electric field so that unnecessary joule heat can be reduced and the probability of death or damage of the target biological particles during the manipulating process can be reduced.

Figure 14B:
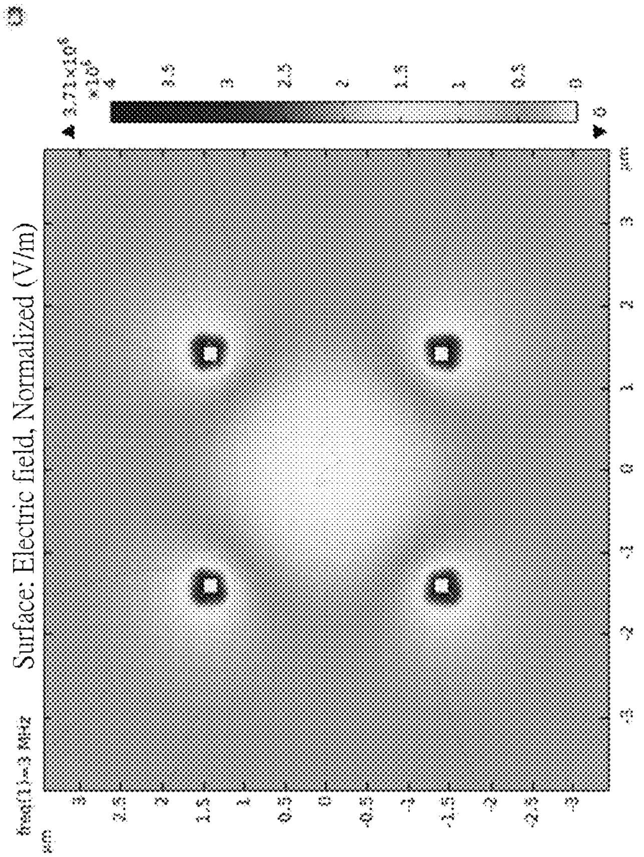
FIGS. 14A and 14B are electrical simulation diagrams of a manipulation unit according to one embodiment of the present invention.
Figure 14A:
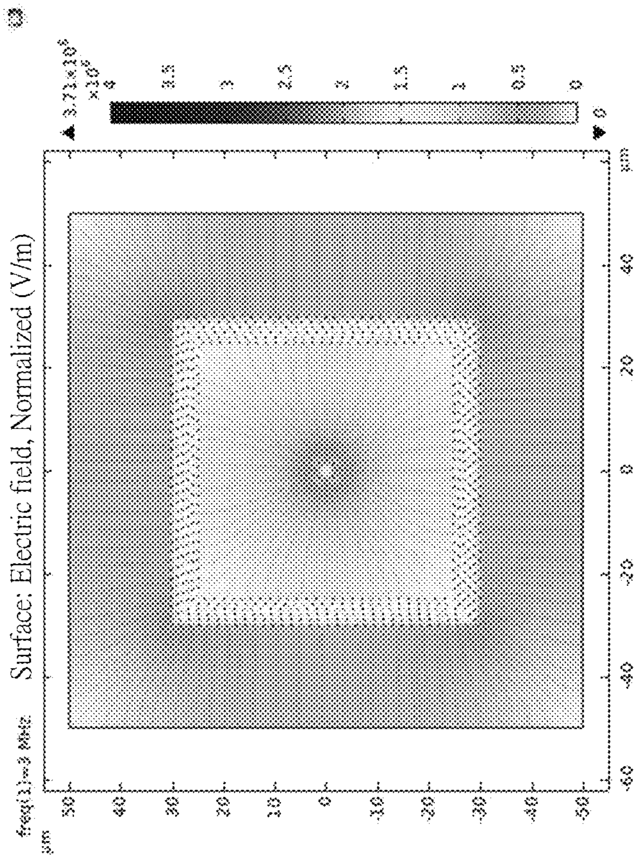

FIGS. 14A and 14B are electrical simulation diagrams of a manipulation unit according to one embodiment of the present invention. FIG. 14B is a local enlargement diagram corresponding to a central region of the FIG. 14A. Referring to FIGS. 1A, 1B and 14A, the dot electrodes located in the center of FIG. 14A and the surrounding dot electrodes respectively correspond to the core electrode 110 and the internal electrode 120 of the manipulation unit 100 of the present invention. This design structure is just an example. A person skilled in the art can adjust the design structure according to the requirements, and not limited thereto. In the embodiment, a design of four core working electrodes, for example, is adopted for the core working electrode 112 of the core electrode 110. The average diameter of the core working electrode for example may be, for example, about 0.2 μm. The average spacing of the core working electrodes may be, for example, about 3 μm. A design of multi-circle quadrangular arrangement of first working electrodes, for example, is adopted for the first working electrodes 122 of the internal electrode 120. The side length may be, for example, about 60 μm. The average diameter of the first working electrode may be, for example, about 0.2 μm. The average spacing of the first working electrode may be, for example, about 2 μm. When the four core working electrodes are applied with a constant voltage or ground, and the multiple circular first working electrodes are applied with a first AC voltage with a frequency, for example, about 3 MHz, then the electric power lines of electric field simulation in FIG. 14A are formed, with radiating electric power lines approaching the central core working electrodes. From the electric field index at the right side of FIG. 14A, it can be understood that most electric fields of the manipulation unit in FIG. 14A can even reach more than $0.5\times10^6$V/m. As shown in FIG. 14B, the electric fields of the central core working electrodes can even reach $3.71\times10^6$V/m. A higher voltage can be applied if necessary to make the electric fields at most region of the manipulation unit reach more than $1.0\times10^6$V/m, but not limited thereto. By using the manipulation unit in FIG. 14A, the effect of easily manipulating the target biological particles can be achieved, and the target biological particles can be attracted to the first working electrodes and substantially adsorbed on the core working electrodes. In addition, the generation of unnecessary joule heat can be decreased, and the probability of death or damage of the target biological particles during the manipulating process can be reduced.

Figure 15A:
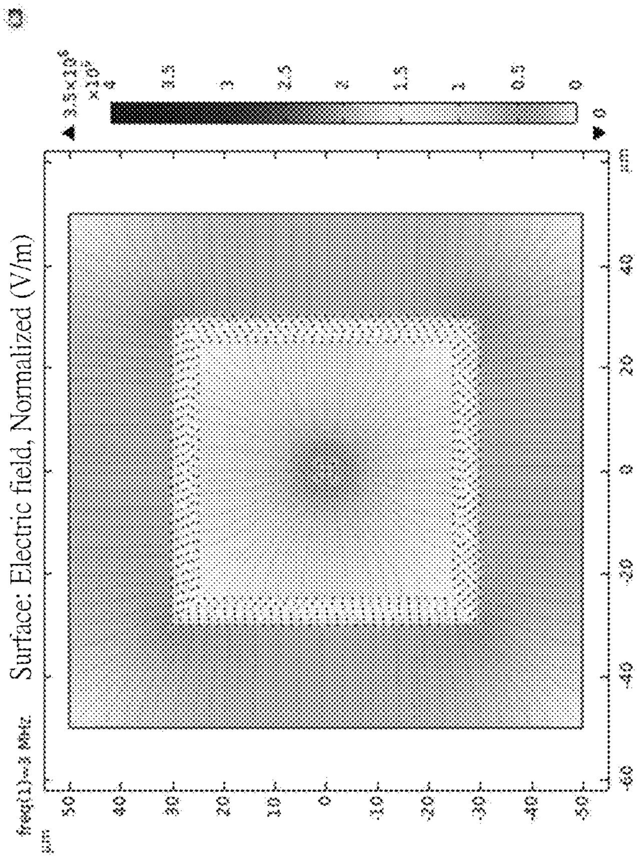
FIGS. 15A and 15B are electrical simulation diagrams of a manipulation unit according to another embodiment of the present invention.
Figure 15B:
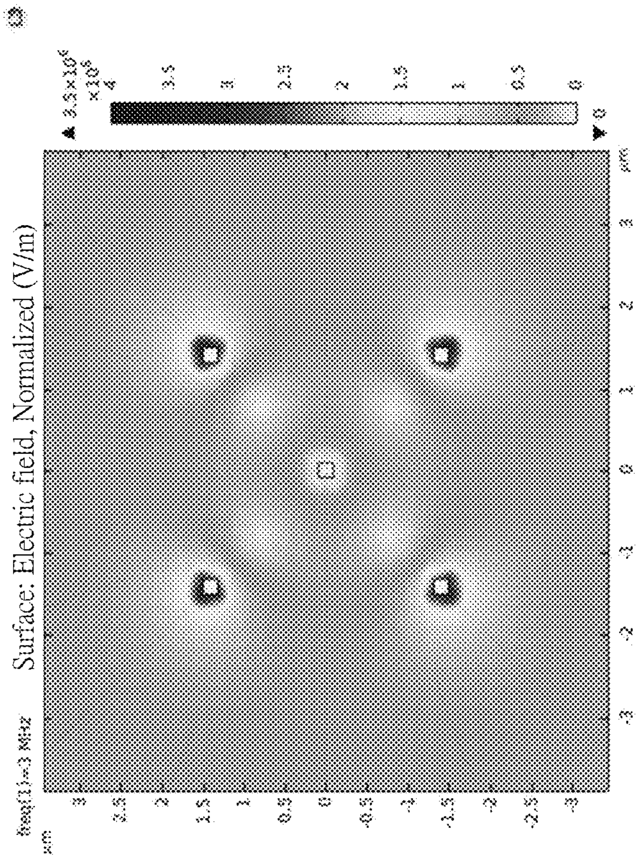

FIGS. 15A and 15B are electrical simulation diagrams of a manipulation unit according to another embodiment of the present invention. FIG. 15B is a local enlargement diagram corresponding to a central region of the FIG. 15A. Referring to FIGS. 1A, 1B and 15A, in the embodiment, a design of five core working electrodes, for example, is adopted for the core working electrode 112 of the core electrode 110. Compared to the embodiment of FIGS. 14A and 14B, one core working electrode as shown in FIG. 15B is added at the center of the four working electrodes in the embodiment of FIGS. 15A and 15B. The other design conditions are all substantially the same to the embodiment of FIGS. 14A and 14B and will not be described in detail herein. From the electric field index at the right side of FIG. 15A, it can be understood that most of the electric fields of the manipulation unit in FIG. 15A can still reach above $0.5\times10^6$V/m. As shown in FIG. 15B, the electric fields of the central core working electrodes can still reach $3.5\times10^6$V/m. The manipulation unit in FIG. 15A can still maintain quite strong manipulating electric fields, and the effect of easily manipulating the target biological particles can be achieved.

Figure 16B:
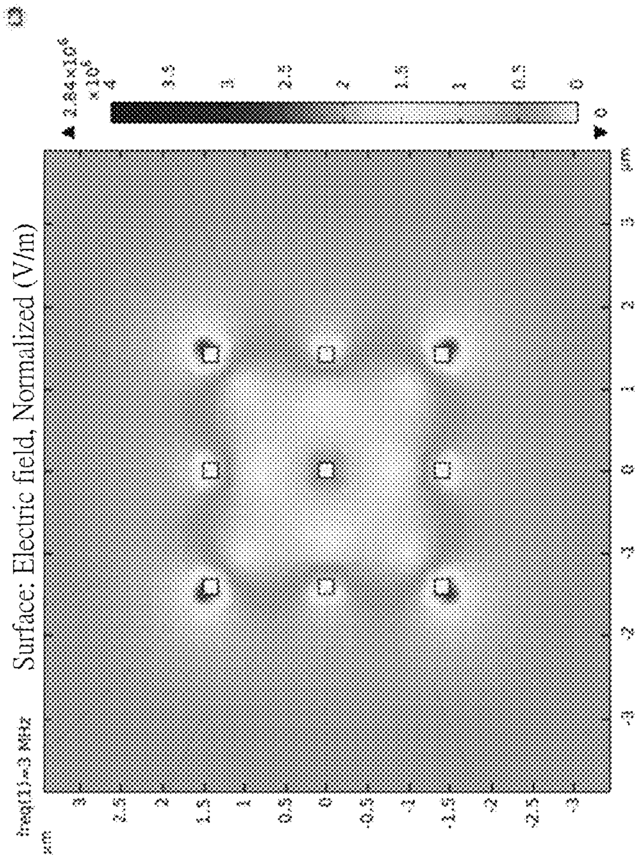
FIGS. 16A and 16B are electrical simulation diagrams of a manipulation unit according to another embodiment of the present invention.
Figure 16A:
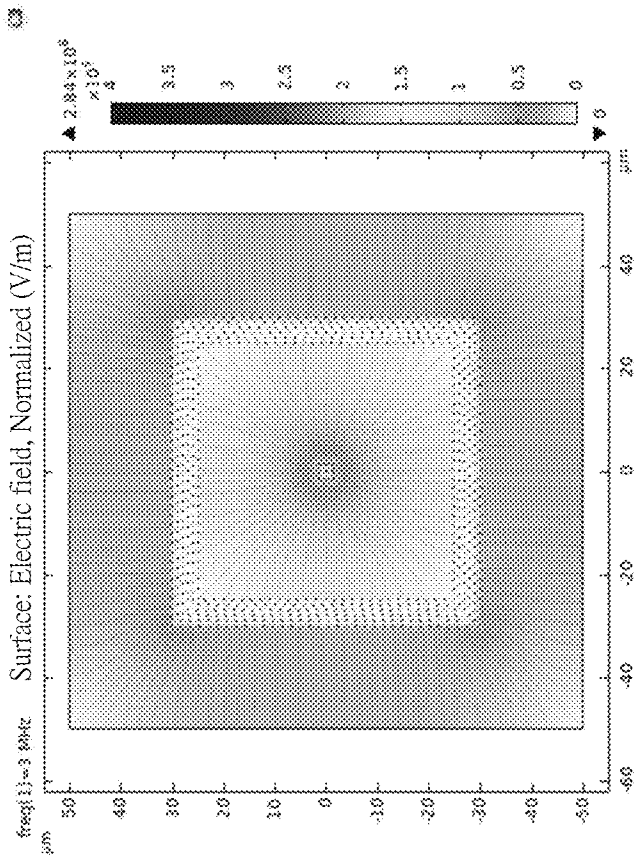

FIGS. 16A and 16B are electrical simulation diagrams of a manipulation unit according to another embodiment of the present invention. FIG. 16B is a local enlargement diagram corresponding to a central region of the FIG. 16A. Referring to FIGS. 1A, 1B and 16A, in the embodiment, a design of nine core working electrodes, for example, is adopted for the core working electrode 112 of the core electrode 110. Different from the embodiment of FIGS. 15A and 15B, in the middle of each of the four sides of the embodiment of FIGS. 16A and 16B, one core working electrode is added, as shown in FIG. 16B. The other design conditions are all substantially the same as the embodiment of FIGS. 14A and 14B and the embodiment of FIGS. 15A and 15B and will not be described in detail herein. From the electric field index at the right side of FIG. 16A, it can be understood that most of the electric fields of the manipulation unit in FIG. 16A can still reach above $0.5\times10^6$V/m. As shown in FIG. 16B, the electric fields of the central core working electrodes can still reach $2.84\times10^6$V/m. The manipulation unit in FIG. 16A can still maintain quite strong manipulating electric fields, and the effect of easily manipulating the target biological particles can be achieved.

From the above three embodiments, one can see that the manipulation unit 100 of the present invention can easily reach the required electric field for manipulating the target biological particles. Even when the number of the core working electrodes 112 are increased, a high-performance manipulating electric field can still be maintained so that generation of unnecessary joule heat can be decreased and the probability of death or damage of the target biological particles during the manipulating process can be reduced.

Figure 17A:
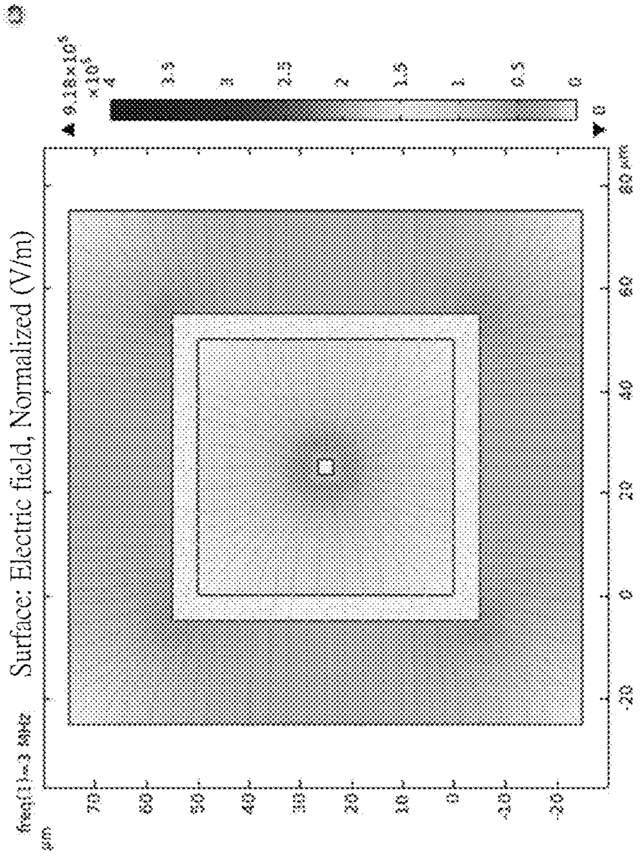
FIGS. 17A and 17B are electrical simulation diagrams of a manipulation unit according to a comparative embodiment.
Figure 17B:
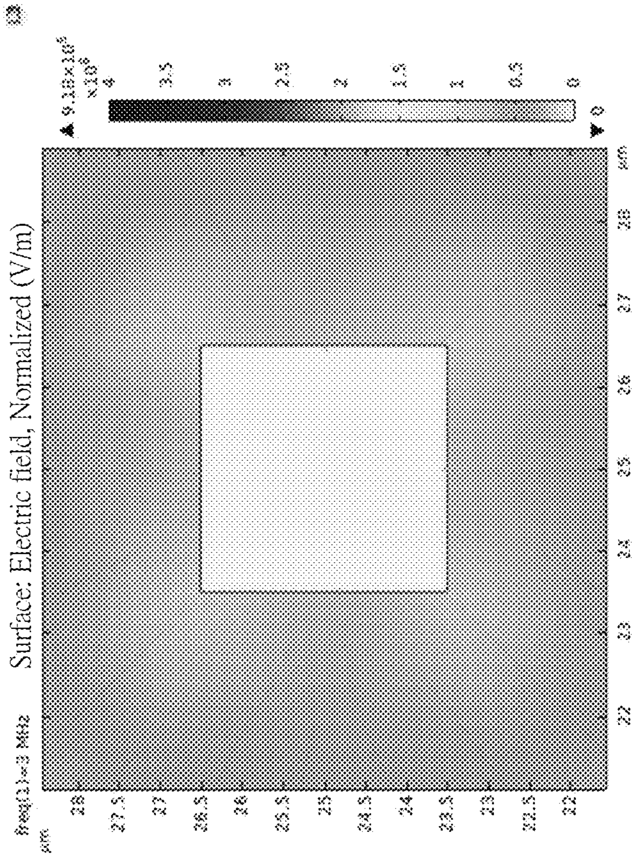

FIGS. 17A and 17B are electrical simulation diagrams of a manipulation unit according to a comparative embodiment. FIG. 17B is a local enlargement diagram corresponding to a central region of FIG. 17A. At the center of FIGS. 17A and 17B of the comparative embodiment, a square plate electrode is used, and the side length is, for example, about 3 μm. A square ring electrode (line electrode) is used at the surrounding, and the side length is, for example, about 60 μm. The other design conditions are all substantially the same as those of the embodiment of FIGS. 14A and 14B and will not be described in detail herein. As shown by the electric field index at the right side of FIG. 17A, the electric fields of the manipulation unit in FIG. 17A have greatly reduced to only about $0.5\times10^5$V/m, which is only one-tenth of the electric field of the previous three embodiments illustrated in FIGS. 14A to 16B. As shown in FIG. 17B of the comparative embodiment, the electric fields of the central plate electrode are only about $9.18\times10^5$V/m. Therefore, the manipulating effect of the comparative embodiment has greatly reduced, and it is difficult to reach the required manipulating electric fields. On the other hand, if the required electric field strength is to be reached in the comparative embodiment, a voltage ten times the original voltage must be applied, and it would come with a sharp rise in the corresponding current. Such a high voltage and high current would cause excessive joule heat, and the temperature of the solution in the nearby area would thus increase significantly. The excessive joule heat would then be transferred to the target biological particles and consequently cause death or damage of the target biological particles. Therefore, the previous three embodiments illustrated in FIGS. 14A to 16B of the present invention use dot electrodes to greatly improve the electric field strength and distribution. As a result, the required electric field for manipulation can be easily reached, and it is not likely to cause death or damage of the manipulated biological particles.

In conclusion, the manipulation unit, the dual manipulation unit and manipulation equipment of the present invention use an insulating layer to cover the first connecting electrode and the second connecting electrode to prevent unnecessary spillover of joule heat. The core working electrode, the first working electrode and the second working electrode protrude from the insulating layer, and the dot electrodes are used to improve the formation efficiency and intensity of electric field. The core working electrode is surrounded by the first working electrode, and the first working electrode is surrounded by the second working electrode, so that the target biological particles are more easily adsorbed on the core working electrode. The structural design of the present invention uses relatively small electric power, i.e., uses a relatively small voltage and current, to provide electric fields with sufficient strength and avoid unnecessary power dissipation that generates joule heat and causes high temperature at nearby local regions and thermal convection or thermal turbulence to the surrounding solution. As a result, unnecessary flow of the biological particles can be reduced. The structural design of the manipulation unit of the present invention can easily attract biological particles to adsorb on the core electrode and perfectly manipulate the biological particles to arrive at the target electrode, preventing death or damage of the biological particles during the manipulation process. In addition, the dual electrode of the dual manipulation unit uses a lower manipulating voltage to reach the required manipulating electric field strength. At the same time, unnecessary joule heat transferred to the manipulated biological particles can be avoided, and the probability of death of the manipulated biological particles can be further reduced. Moreover, the biological particles can be precisely paired, and the success rate of electrofusion manipulation can be increased.

The present invention is described by the above-mentioned related embodiments, but the above-mentioned embodiments are only examples for implementing the present invention. It is to be pointed out that the disclosed embodiments do not limit the scope of the present invention. On the contrary, modifications and equivalent arrangements within the spirit and scope of the patent application are included in the scope of the present invention.

What is claimed is:

1. A manipulation unit, adapted for manipulating a biological particle, the manipulation unit comprising:
- a substrate;
- a core electrode, disposed on the substrate, and the core electrode including a core working electrode;
- an internal electrode, disposed on the substrate, and the internal electrode including a plurality of first working electrodes and a first connecting electrode electrically connected to the plurality of first working electrodes;
- an external electrode, disposed on the substrate, and the external electrode including a plurality of second working electrodes and a second connecting electrode electrically connected to the plurality of second working electrodes; and
- an insulating layer, disposed on the substrate, the first connecting electrode and the second connecting electrode being covered by the insulating layer, the core working electrode, the plurality of first working electrodes and the plurality of second working electrodes being respectively protruded from the insulating layer, and the core working electrode being surrounded by the plurality of first working electrodes and the plurality of first working electrodes being surrounded by the plurality of second working electrodes.

2. The manipulation unit according to claim 1, wherein the core electrode is encircled by the first connecting electrode and the first connecting electrode is encircled by the second connecting electrode.

3. The manipulation unit according to claim 1, further comprises a first connecting line electrically connected to the first connecting electrode, and the first connecting line is electrically connected to a first AC voltage.

4. The manipulation unit according to claim 1, further comprises a second connecting line electrically connected to the second connecting electrode, and the second connecting line is electrically connected to a second AC voltage.

5. The manipulation unit according to claim 1, further comprises an auxiliary external electrode disposed on the substrate, the auxiliary external electrode includes a plurality of third working electrodes and a third connecting electrode electrically connected to the plurality of third working electrodes, wherein the plurality of third working electrodes are respectively protruded from the insulating layer, and the plurality of second working electrodes are surrounded by the plurality of third working electrodes.

6. The manipulation unit according to claim 5, further comprises a third connecting line electrically connected to the third connecting electrode, and the third connecting line is electrically connected to a third AC voltage.

7. The manipulation unit according to claim 1, wherein a first average radial distance is located between the plurality of first working electrodes and the core working electrode and a second average radial distance is located between the plurality of first working electrodes and the plurality of second working electrodes, and a ratio of the first average radial distance to the second average radial distance is ranging between 0.1 and 10.

8. The manipulation unit according to claim 1, further comprises a single particle adsorbing electrode disposed on the substrate, wherein the single particle adsorbing electrode is disposed between the core electrode and the internal electrode, and the single particle adsorbing electrode protruded from the insulating layer.

* * * * *